United States Patent
Nagao et al.

(10) Patent No.: US 10,789,228 B2
(45) Date of Patent: Sep. 29, 2020

(54) DATA PRESENCE/ABSENCE DETERMINATION APPARATUS AND COMPUTER-READABLE STORAGE MEDIUM STORING PROGRAM FOR DETERMINATION OF DATA PRESENCE/ABSENCE

(71) Applicant: FUJITSU LIMITED, Kawasaki-shi, Kanagawa (JP)

(72) Inventors: Takuya Nagao, Nagoya (JP); Tomohiro Uno, Nagoya (JP); Takashi Kuwayama, Nagoya (JP); Tomonori Furuta, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 16/174,407

(22) Filed: Oct. 30, 2018

(65) Prior Publication Data

US 2019/0155927 A1 May 23, 2019

(30) Foreign Application Priority Data

Nov. 21, 2017 (JP) .................................. 2017-223761

(51) Int. Cl.
*G06F 16/22* (2019.01)
*G06F 16/23* (2019.01)
(Continued)

(52) U.S. Cl.
CPC ...... *G06F 16/2237* (2019.01); *G06F 16/2379* (2019.01); *G06F 16/24556* (2019.01); *G06F 16/9535* (2019.01)

(58) Field of Classification Search
CPC ............. G06F 16/2237; G06F 16/2379; G06F 16/24556; G06F 16/9535
See application file for complete search history.

(56) References Cited

U.S. PATENT DOCUMENTS 7,602,785 B2 * 10/2009 Dharmapurikar ... H04L 45/7457
370/392
8,290,972 B1 10/2012 Deshmukh et al.
(Continued)

FOREIGN PATENT DOCUMENTS

JP 2006-106810 A 4/2006
JP 2013-3653 A 1/2013
(Continued)

OTHER PUBLICATIONS

European Patent Office dated Feb. 11, 2020 for corresponding European Patent Application No. 18203351.4, 6 pages.
(Continued)

*Primary Examiner* — Scott A. Waldron
(74) *Attorney, Agent, or Firm* — Fujitsu Patent Center

(57) ABSTRACT

A storing unit stores a data set including a plurality of data elements and a first Bloom filter used to determine whether a query-target data element is present in the data set. A calculating unit deletes, when some data elements are deleted, a first bit array from the first Bloom filter. The first bit array has the number of bits corresponding to the number of deleted data elements. When a query-target first data element is entered, the calculating unit adds a second bit array temporarily to a second Bloom filter obtained by deleting the first bit array. The second bit array has the same number of bits as the first bit array, with all bits set to a specific value. Using the second Bloom filter, the calculating unit determines whether the first data element is present in the data set, from which some data elements have been deleted.

11 Claims, 21 Drawing Sheets

(51) Int. Cl.
  *G06F 16/9535* (2019.01)
  *G06F 16/2455* (2019.01)

(56) References Cited

U.S. PATENT DOCUMENTS

| | | | |
|---|---|---|---|
| 10,318,484 B2* | 6/2019 | Finlay | G06F 16/1744 |
| 2012/0317130 A1 | 12/2012 | Watanabe et al. | |
| 2013/0173853 A1* | 7/2013 | Ungureanu | G06F 12/124 |
| | | | 711/103 |
| 2013/0262472 A1 | 10/2013 | Watanabe et al. | |
| 2014/0244779 A1 | 8/2014 | Roitshtein et al. | |
| 2016/0011789 A1 | 1/2016 | Tsuchiya et al. | |

FOREIGN PATENT DOCUMENTS

| | | |
|---|---|---|
| JP | 2013-206154 A | 10/2013 |
| JP | 2014-199573 A | 10/2014 |

OTHER PUBLICATIONS

Extended European Search Report dated Jan. 8, 2019 for corresponding European Patent Application No. 18203351.4, 8 pages.

* cited by examiner

112 CHUNK MAP TABLE

| ino | offset | size | gno | gindex |
|-----|--------|------|-----|--------|
| i1  | o11    | s11  | g1  | x1     |
| i1  | o12    | s12  | g1  | x2     |
| i2  | o21    | s21  | g1  | x3     |
| i2  | o22    | s22  | g1  | x4     |
| i2  | o23    | s23  | g2  | x1     |
| i2  | o24    | s24  | g2  | x2     |
| ... | ...    | ...  | ... | ...    |

FIG. 5

113 CHUNK META-TABLE

| gno | gindex | offset | size | hash |
|---|---|---|---|---|
| g1 | x1 | of1 | s1 | h1 |
| g1 | x2 | of2 | s2 | h2 |
| g1 | x3 | of3 | s3 | h3 |
| g1 | x4 | of4 | s4 | h4 |
| ... | ... | ... | ... | ... |

114 REFERENCE COUNTER TABLE

| gno | gindex | refcnt |
|---|---|---|
| g1 | x1 | 1 |
| g1 | x2 | 2 |
| g1 | x3 | 3 |
| g1 | x4 | 1 |
| ... | ... | ... |

115 CHUNK DATA TABLE

| gno | gindex | data |
|---|---|---|
| g1 | x1 | d1 |
| g1 | x2 | d2 |
| g1 | x3 | d3 |
| g1 | x4 | d4 |
| ... | ... | ... |

FIG. 6

116 DELETION COUNTER TABLE

| gno | delcnt |
|---|---|
| g1, g2, ··· | 1000 |
| g21, g22, ··· | 0 |
| g41, g42, ··· | 20 |
| ··· | ··· |

FIG. 8

DATA PRESENCE/ABSENCE DETERMINATION APPARATUS AND COMPUTER-READABLE STORAGE MEDIUM STORING PROGRAM FOR DETERMINATION OF DATA PRESENCE/ABSENCE

CROSS-REFERENCE TO RELATED APPLICATION

This application is based upon and claims the benefit of priority of the prior Japanese Patent Application No. 2017-223761, filed on Nov. 21, 2017, the entire contents of which are incorporated herein by reference.

FIELD

The embodiments discussed herein are related to a data processing apparatus and storage medium storing program for data processing.

BACKGROUND

Bloom filters are data structures used in a membership test to determine whether a given element is present in a data set including a plurality of data elements. A Bloom filter may be used to remove repeating copies of duplicate data (i.e., deduplicate) on a storage apparatus. In this case, whether data requested to be written is already stored in the storage apparatus is checked using the Bloom filter. As one possible application of Bloom filters, a hierarchical Bloom filter consisting of Bloom filters in a plurality of hierarchical levels has been proposed.

Japanese Laid-open Patent Publication No. 2014-199573
Japanese Laid-open Patent Publication No. 2013-3653

Bloom filters are generally characterized by their intrinsic inability to reduce the number of bits therein even though some data elements are removed from a managed data set. In recent years, data sets managed using Bloom filters include a vast number of data elements, and the number of bits in those Bloom filters continues to grow to accommodate the increased number of data elements. As a result, Bloom filters have become less space-efficient and taken up much more storage space. In this context, the inability of making a Bloom filter smaller so as to consume less storage space by reducing the number of bits in the Bloom filter, even though the number of data elements included in a data set is reduced, stands as a prominent obstacle.

SUMMARY

According to an aspect, there is provided a data processing apparatus including a memory configured to store a data set including a plurality of data elements and a first Bloom filter used in a membership test to determine whether a query-target data element is present in the data set and having specific bits set to a specific value, the specific bits being determined by predetermined calculation using the plurality of data elements, respectively; and a processor configured to execute a process including deleting, when some data elements are deleted from the data set, a first bit array from a high order end of the first Bloom filter, the first bit array having a number of bits corresponding to a number of the some data elements, adding, when a first data element is entered as the query-target data element, a second bit array temporarily at a high order end of a second Bloom filter, which is obtained by the deleting of the first bit array from the first Bloom filter, the second bit array having a same number of bits as the first bit array, with all bits set to the specific value, and running the membership test, using the second Bloom filter with the second bit array added thereto, to determine whether the first data element is present in the data set from which the some data elements have been deleted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates a data structure example of a chunk map table;

FIG. 6 illustrates a data structure example of a chunk meta-table, a reference counter table, and a chunk data table;

FIG. 8 illustrates a data structure example of a deletion counter table;

DESCRIPTION OF EMBODIMENTS

Figure 1:
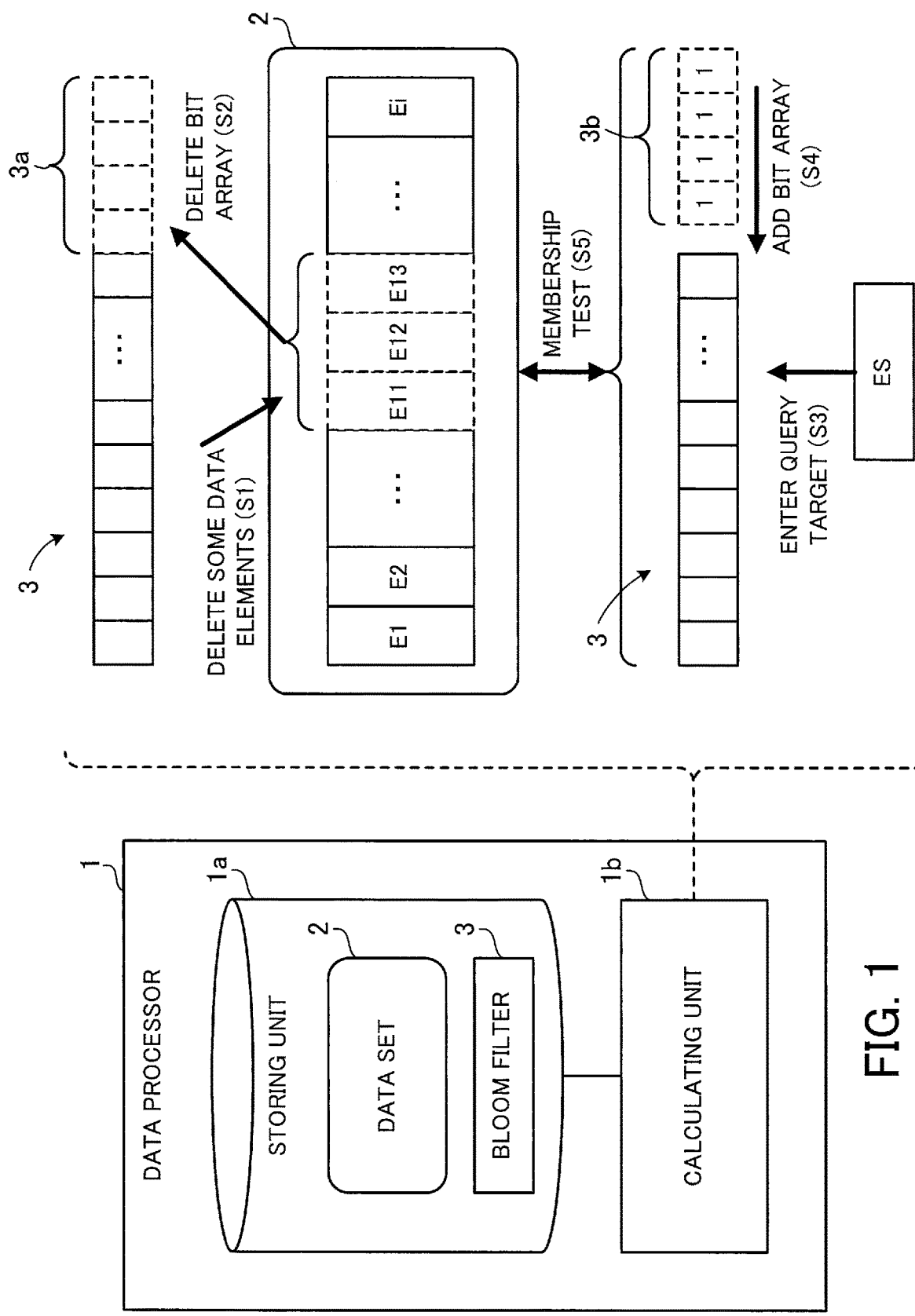
FIG. 1 illustrates a configuration and processing example of a data processor according to a first embodiment.

Several embodiments will be described below with reference to the accompanying drawings, wherein like reference numerals refer to like elements throughout.

(a) First Embodiment

FIG. 1 illustrates a configuration and processing example of a data processor according to a first embodiment. A data processor 1 of FIG. 1 includes a storing unit 1a and a calculating unit 1b. The storing unit 1a is implemented using storage space of a memory device, such as random access memory (RAM) or hard disk drive (HDD), installed in the data processor 1. The calculating unit 1b is implemented, for example, as a processor of the data processor 1.

The storing unit 1a stores therein a data set 2 and a Bloom filter 3. The data set 2 includes a plurality of data elements. In the example of FIG. 1, the data set 2 includes i data elements E1, E2, . . . Ei. The Bloom filter 3 is a data structure used in a membership test to determine whether a query-target data element is present in the data set 2, and is essentially a bit array of a plurality of bits.

In the Bloom filter 3, specific bits determined by predetermined calculation using the respective data elements E1, E2, . . . Ei included in the data set 2 are set to a specific value. Suppose in this embodiment that the specific value is "1", for example. In the case of running a membership test for a query-target data element, for example, the above-cited predetermined calculation is performed using this data element, which then yields specific bits corresponding to the data element. If all the calculated specific bits amongst the bits of the Bloom filter 3 are "1", it is interpreted as possible presence of the data element in the data set 2. On the other hand, if at least one of the specific bits in the Bloom filter 3 is not set to "1", it is interpreted as definite absence of the data element from the data set 2.

The calculating unit 1b performs the following procedure in the case of deleting some data elements from the data set 2 (step S1). Suppose here that the data elements E11 to E13 are deleted from the data set 2, as illustrated in FIG. 1. The calculating unit 1b deletes, from the high order end of the Bloom filter 3, a bit array 3a with the number of bits corresponding to the number of the deleted data elements E11 to E13 (step S2). Herewith, storage space occupied by the Bloom filter 3 is reduced. Note that the number of bits of the bit array 3a deleted from the Bloom filter 3 corresponds to, for example, the ratio of the number of deleted data elements to the number of data elements i included in the data set 2.

If a query-target data element ES is entered later on (step S3), the calculating unit 1b performs the following procedure. The calculating unit 1b first adds a bit array 3b temporarily at the high order end of the Bloom filter 3 with the bit array 3a deleted therefrom (step S4). The bit array 3b has the same number of bits as the bit array 3a, with all bits set to the above specific value (in this case, "1"). Subsequently, the calculating unit 1b runs a membership test to determine whether the data element ES is present in the data set 2, from which the data elements E11 to E13 have been deleted, using the Bloom filter 3 with the bit array 3b added thereto (step S5). Note that the membership test determines the possibility of the data element ES being present in the data set 2.

Generally speaking, a Bloom filter does not support removal of bits even when elements have been deleted from a query-target data set. This is because it is not possible to simply remove bits with a value of "1", determined by calculation to be associated with the deleted elements, since those bits could have been set to "1" by another element or some combination of other elements. Therefore, removing those associated bits from the Bloom filter possibly introduces false negatives in subsequent lookup operations using the Bloom filter.

According to this embodiment, on the other hand, when the Bloom filter 3 from which the bit array 3a was removed in step S2 is used for lookup, the bit array 3b having the same number of bits as the bit array 3a, with all bits set to the above specific value, is temporarily added to the Bloom filter 3. This prevents introducing false negatives in the lookup operation. Therefore, it is possible to remove the bit array 3a from the high order end of the Bloom filter 3 according to a reduction in the number of data elements in the data set 2 due to the deletion of the data elements E11 to E13. This then allows a reduction in storage space consumed by the Bloom filter 3.

(b) Second Embodiment

Figure 2:
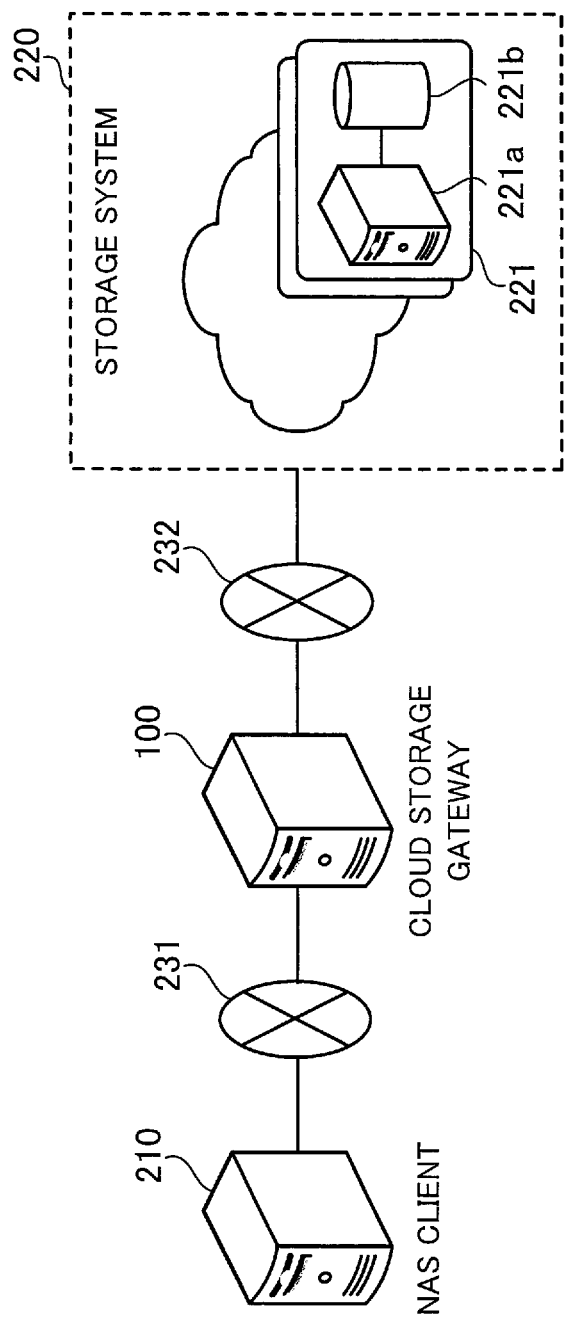
FIG. 2 illustrates a configuration example of an information processing system according to a second embodiment.

FIG. 2 illustrates a configuration example of an information processing system according to a second embodiment. The information processing system of FIG. 2 includes a cloud storage gateway 100, a network attached storage (NAS) client 210, and a storage system 220. The cloud storage gateway 100 is connected to the NAS client 210 via a network 231, and also connected to the storage system 220 via a network 232. Each of these networks may be, for example, a local area network (LAN) or a wide area network (WAN).

The storage system 220 provides cloud storage services via the network 232. Note that storage space made available to a service user (the cloud storage gateway 100 in this example) through the cloud storage services provided by the storage system 220 is sometimes referred to as "cloud storage" in the following description.

In addition, the storage system 220 is implemented, for example, as object storage that manages data as distinct units, called objects, according to this embodiment. For example, the storage system 220 is implemented as a distributed storage system with a plurality of storage nodes 221 each including a control server 221a and a storage device 221b. In this case, in each storage node 221, the control server 221a controls access to the storage device 221b, and the storage device 221b donates its storage space to configure the cloud storage. Which storage node 221 provides storage for each object received from the service user (the cloud storage gateway 100) is decided based on information specific to the object.

On the other hand, the NAS client 210 recognizes the cloud storage gateway 100 as a NAS server that provides storage space managed by a file system. This storage space is cloud storage space provided by the storage system 220. The NAS client 210 requests the cloud storage gateway 100 for file-based data read and write operations, using a protocol such as the Network File System (NFS) or the Common Internet File System (CIFS). That is, the NAS server function on the cloud storage gateway 100 allows the NAS client 210 to use the cloud storage serving as a high-capacity virtual network file system.

The NAS client 210 runs, for example, backup software for data backup. This allows the NAS client 210 to back up files stored therein or those stored in a server connected to the NAS client 210 (for example, a business server) to storage space provided by the NAS server.

The cloud storage gateway 100 is an example of the data processor 1 of FIG. 1. The cloud storage gateway 100 relays data transferred between the NAS client 210 and the cloud storage.

For example, the NAS server function enables the cloud storage gateway 100 to receive a file write request from the NAS client 210 and cache internally a file requested to be written. The cloud storage gateway 100 splits the file requested to be written into chunks and stores, in the cloud storage, actual data in each chunk (hereinafter referred to as "chunk data piece"). At this time, a plurality of chunk data pieces whose total size is greater than or equal to a certain size is grouped together as a "chunk group", which is then transferred to the cloud storage as an object.

In addition, when caching a file, the cloud storage gateway 100 performs "data deduplication", where the file is split into chunks and duplicate chunk data pieces with the same content are eliminated. Then, chunk data pieces are stored after being compressed. For example, some cloud storage services are charged according to the amount of data stored. Since data deduplication and compression reduce the amount of data that needs to be stored in the cloud storage, the cost for the use of services is kept down.

Figure 3:
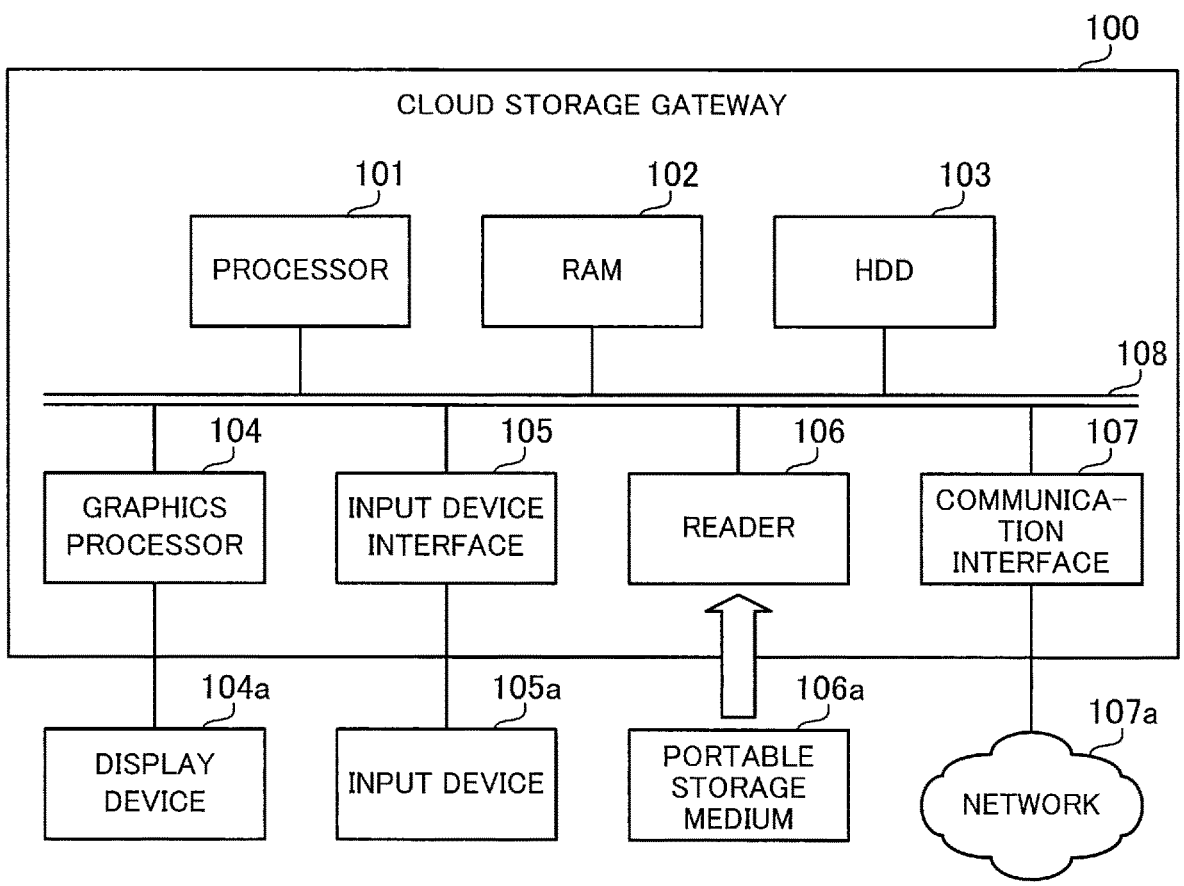
FIG. 3 is a block diagram illustrating an example of a hardware configuration of a cloud storage gateway.

FIG. 3 is a block diagram illustrating an example of a hardware configuration of a cloud storage gateway. The cloud storage gateway 100 is implemented, for example, as a computer illustrated in FIG. 3.

The cloud storage gateway 100 has a processor 101 to control its entire operation. The processor 101 may be a single processing device or a multiprocessor system including two or more processing devices, such as a central processing unit (CPU), micro processing unit (MPU), digital signal processor (DSP), application-specific integrated circuit (ASIC), and programmable logic device (PLD).

The processor 101 is connected to RAM 102 and other various devices and interfaces via a bus 108.

The RAM 102 serves as the primary storage device in the cloud storage gateway 100. Specifically, the RAM 102 is used to temporarily store at least some of the operating system (OS) programs and application programs to be executed by the processor 101, as well as other various data objects to be manipulated by the processor 101 at runtime.

Other devices on the bus 108 include an HDD 103, a graphics processor 104, an input device interface 105, a reader 106, and a communication interface 107.

The HDD 103 serves as a secondary storage device in the cloud storage gateway 100 to store programs and data files of the operating system and applications. Note that a different type of non-volatile storage device, such as a solid state drive (SSD), may be used as a secondary storage device in place of the HDD 103.

The graphics processor 104, coupled to a display device 104a, produces video images in accordance with drawing commands from the processor 101 and displays them on a screen of the display device 104a. The display device 104a may be, for example, a liquid crystal display or an organic electroluminescence (EL) display.

The input device interface 105 is connected to an input device 105a and transmits signals output from the input device 105a to the processor 101. The input device 105a is, for example, a keyboard or a pointing device. Examples of the pointing device include a mouse, a touch panel, a tablet, a touch-pad, and a track ball.

Into the reader 106, a portable storage medium 106a is loaded. The reader 106 reads data recorded on the portable storage medium 106a and transmits the read data to the processor 101. The portable storage medium 106a may be an optical disk, a magneto optical disk, or semiconductor memory, for example.

The communication interface 107 transmits and receives data to and from different devices via a network 107a.

The above-described hardware configuration may be used to implement processing functions of the cloud storage gateway 100. The same hardware configuration of the cloud storage gateway 100 of FIG. 3 may similarly be applied to the NAS client 210 and the control server 221a.

Figure 4:
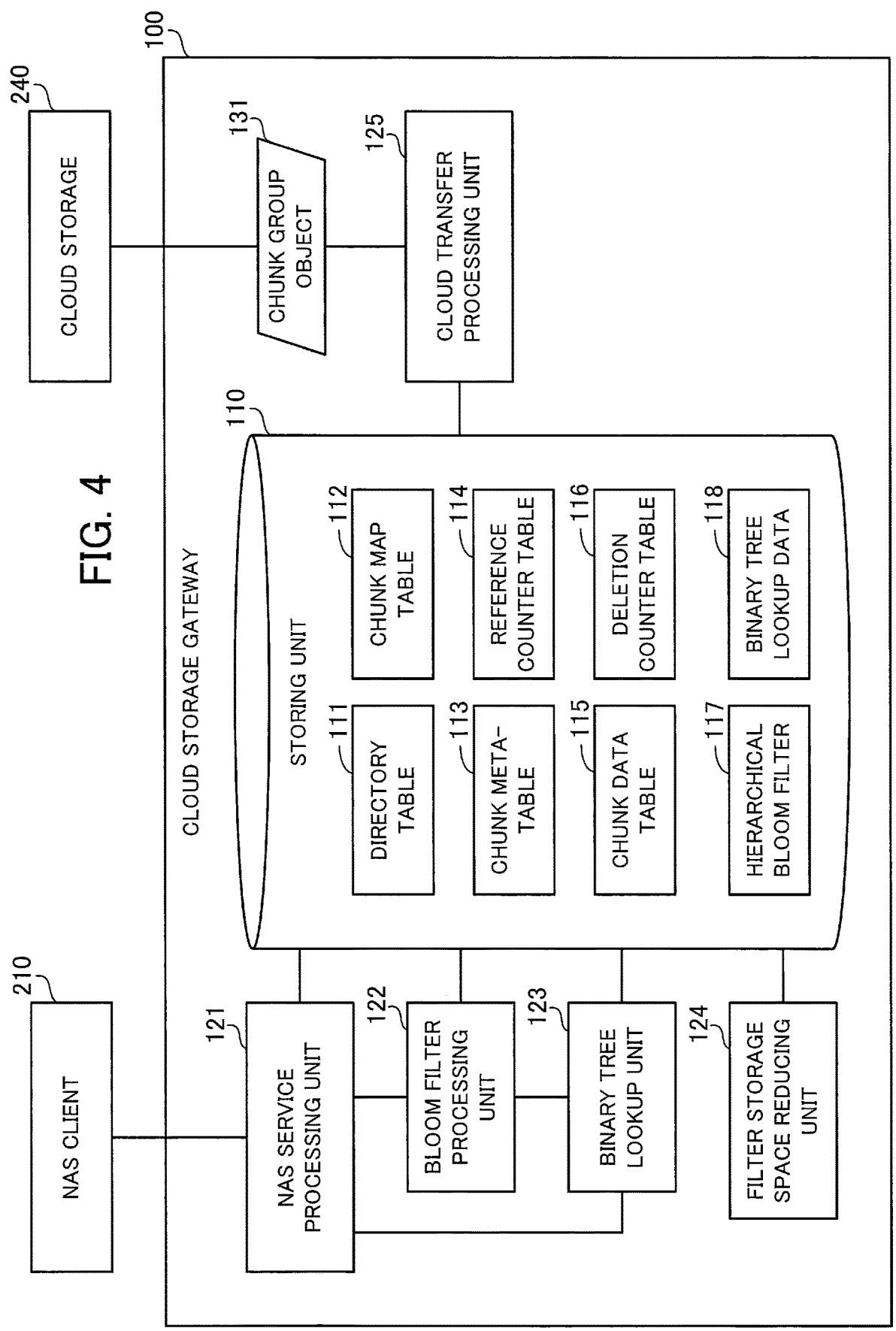
FIG. 4 is a block diagram illustrating a configuration example of processing functions of the cloud storage gateway.

FIG. 4 is a block diagram illustrating a configuration example of processing functions of a cloud storage gateway. The cloud storage gateway 100 includes a storing unit 110, a NAS service processing unit 121, a Bloom filter processing unit 122, a binary tree lookup unit 123, a filter storage space reducing unit 124, and a cloud transfer processing unit 125.

Note that the storing unit 110 is implemented using storage space secured in a storage device of the cloud storage gateway 100, for example, the RAM 102 or the HDD 103. In addition, processing functions of the NAS service processing unit 121, the Bloom filter processing unit 122, the binary tree lookup unit 123, the filter storage space reducing unit 124, and the cloud transfer processing unit 125 are implemented, for example, by the processor 101 executing predetermined programs.

The storing unit 110 stores therein a directory table 111, a chunk map table 112, a chunk meta-table 113, a reference counter table 114, a chunk data table 115, a deletion counter table 116, a hierarchical Bloom filter 117, and binary tree lookup data 118.

The directory table 111 is a management table for representing a directory structure of a file system. The directory table 111 contains records corresponding to directories (folders) in the directory structure or files in the directories. Each record contains an inode number used to refer to a directory or file. In addition, individual records contain, for example, inode numbers of their parent directories, thus representing the relationship between directories and between directories and files.

The chunk map table 112 and the chunk meta-table 113 are management tables for managing the relationship between files and chunk data pieces and between chunk data pieces and chunk groups. A chunk group, which includes a plurality of chunk data pieces whose total size is greater than or equal to a predetermined size, is a transfer unit used to transfer chunk data pieces to cloud storage 240. The chunk data table 115 holds chunk data pieces, thus functioning as a cache for actual data of files.

The reference counter table 114 holds, with respect to each chunk data piece, a reference counter value indicating how many chunks refer to the chunk data piece. The deletion counter table 116 holds, with respect to each management-target data group, a deletion counter value indicating the number of invalid chunk data pieces, the reference counters of which read "0". Each data group includes chunk data pieces of up to a predetermined number of chunk groups, as described later.

The hierarchical Bloom filter 117 and the binary tree lookup data 118 are used to search chunk data pieces stored in the storing unit 110 for the same data as each chunk data piece obtained by splitting a file. The hierarchical Bloom filter 117 consists of a set of Bloom filters in a plurality of hierarchical levels. Each of these Bloom filters is essentially a bit array of a predetermined number of bits. The binary tree lookup data 118 includes management data used to run a search for each chunk data piece using binary tree lookup.

The NAS service processing unit 121 performs interface processing as a NAS server. That is, the NAS service processing unit 121 receives, from the NAS client 210, a request for reading, writing, or deleting a file, then performs an operational process according to the request, and returns a response to the NAS client 210. In the case of receiving a request for writing a new file, for example, the NAS service processing unit 121 splits actual data of the file into chunks, and stores the split actual data in the storing unit 110 while performing deduplication.

The Bloom filter processing unit 122 performs, in response to a request from the NAS service processing unit 121, a process of searching chunk data pieces stored in the storing unit 110 for the same data as each chunk data piece obtained by splitting a file, using the hierarchical Bloom filter 117. The binary tree lookup unit 123 performs, in response to a request from the NAS service processing unit 121, a process of searching for the same data as each chunk data piece obtained by splitting a file, using the binary tree lookup data 118.

As described later, the Bloom filter processing unit 122 performs a lookup operation to narrow the search to data groups including chunk data pieces that meet conditions. The binary tree lookup unit 123 performs a lookup operation to correctly identify a chunk data piece meeting the conditions amongst the selected data groups.

The filter storage space reducing unit 124 performs garbage collection on chunk data pieces included in each chunk group. As described later, garbage collection is a process of freeing up storage space used by invalid chunk data pieces by collecting fragmented valid chunk data pieces together to the same storage space and compacting them. Based on processing results of the garbage collection, the filter storage space reducing unit 124 reduces the number of bits in bit arrays included in the hierarchical Bloom filter 117, to allow a reduction in storage space consumed by the hierarchical Bloom filter 117.

The cloud transfer processing unit 125 transfers, to the cloud storage 240, chunk data pieces written to the storing unit 110, asynchronously with the process of writing data to the storing unit 110, carried out by the NAS service processing unit 121. As described above, data is transferred to the cloud storage 240 on an object-by-object basis. In this embodiment, the cloud transfer processing unit 125 generates a single chunk group object 131 using chunk data pieces included in one chunk group and transfers it to the cloud storage 240.

FIG. 5 illustrates a data structure example of a chunk map table. The chunk map table 112 is a management table for associating files and chunk data pieces with each other. The chunk map table 112 contains records with entries in columns named "ino", "offset", "size", "gno", and "gindex". Each record is associated with one chunk generated by splitting actual data of a file.

Each entry in the "ino" column indicates the inode number of a file that includes the associated chunk. Each entry in the "offset" column indicates the offset of the beginning of the associated chunk from the beginning of the actual data of the file. The combination of such entries in the "ino" and "offset" columns uniquely identifies each chunk within a file.

Each entry in the "size" column indicates the size of the associated chunk. Assume in this embodiment that chunks have variable sizes. For example, the NAS service processing unit 121 determines split points in the actual data of a file according to predetermined calculation rules in such a manner as to facilitate generation of chunks including the same data. Herewith, variable sized chunks are generated.

Each entry in the "gno" column indicates the group number of a chunk group to which a chunk data piece included in the associated chunk belongs. Each entry in the "gindex" column indicates the index number of the chunk data piece in the chunk group. Entries in the "ino" and "offset" columns and those in the "gno" and "gindex" columns are registered in each record, thereby associating individual chunks with chunk data pieces.

Referring to the example of FIG. 5, a file with an inode number "i1" is split into two chunks while a file with an inode number "i2" is split into four chunks. Data of the two chunks included in the former file and data of the first two chunks amongst the four chunks included in the latter file are stored in the storing unit 110 as chunk data pieces belonging to a chunk group with a group number "g1". In addition, data of the third and fourth chunks amongst the four chunks of the latter file is stored in the storing unit 110 as chunk data pieces belonging to a chunk group with a group number "g2".

FIG. 6 illustrates a data structure example of a chunk meta-table, a reference counter table, and a chunk data table.

The chunk meta-table 113 is a management table for associating chunk data pieces and chunk groups with each other. The chunk meta-table 113 contains records with entries in columns named "gno", "gindex", "offset", "size", and "hash". Each record is associated with a single chunk data piece.

Each entry in the "gno" column indicates the group number of a chunk group to which the associated chunk data piece belongs. Each entry in the "gindex" column indicates the index number of the chunk data piece in the chunk group. Each entry in the "offset" column indicates the offset of the beginning of the associated chunk data piece from the beginning of the chunk group. The combination of such entries in the "gno" and "gindex" columns uniquely identifies each chunk data piece. The combination of entries in the "gno" and "offset" columns uniquely identifies the storage location of each chunk data piece. Each entry in the "size" column indicates the size of the associated chunk data piece. Each entry in the "hash" column indicates a hash calculated based on the associated chunk data piece.

The reference counter table 114 contains records with entries in columns named "gno", "gindex", and "refcnt". Each record is associated with one chunk data piece identified by its entries in the "gno" and "gindex" columns. Each entry in the "refcnt" column indicates a reference counter value corresponding to the associated chunk data piece. The reference counter value indicates how many chunks refers to the chunk data piece. In other words, this value indicates how many times the chunk data piece has appeared in different chunks. Suppose, for example, that a reference counter value corresponding to a given combination of entries in the "gno" and "gindex" columns is "2". In this case, the chunk map table 112 includes two records with this combination of entries in the "gno" and "gindex" columns.

The chunk data table 115 contains records with entries in columns named "gno", "gindex", and "data". Each entry in the "data" column stores therein a chunk data piece identified by its corresponding entries in the "gno" and "gindex" columns.

Figure 7:
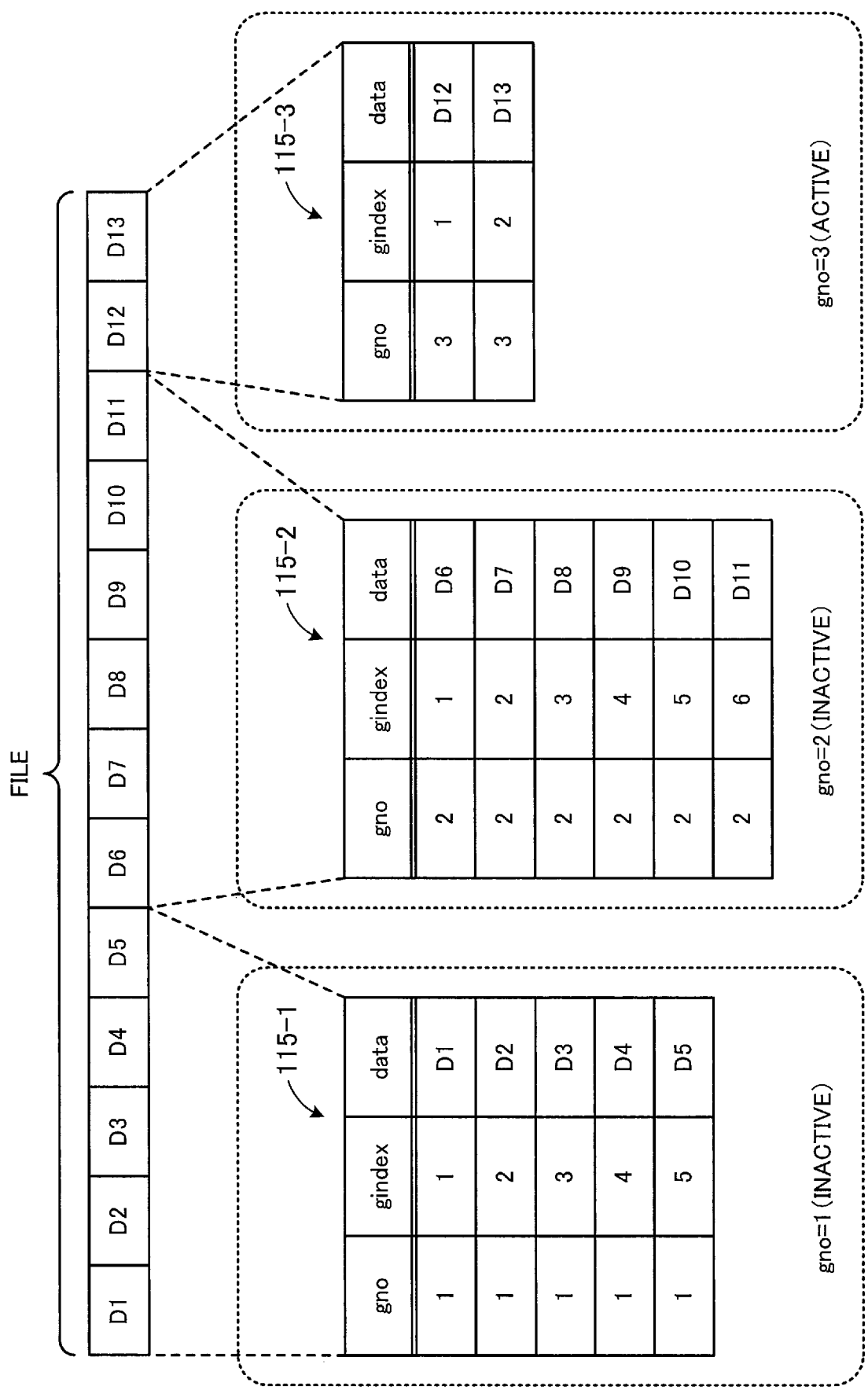
FIG. 7 illustrates a structure example of a chunk group.

FIG. 7 illustrates a structure example of a chunk group. How to generate chunks and chunk groups is described with reference to FIG. 7.

Note that a table 115-1 of FIG. 7 is created by extracting, from the chunk data table 115, records corresponding to chunk data pieces that belong to a chunk group with a group number "1". Similarly, a table 115-2 of FIG. 7 is created by extracting, from the chunk data table 115, records corresponding to chunk data pieces that belong to a chunk group with a group number "2". A table 115-3 of FIG. 7 is created by extracting, from the chunk data table 115, records corresponding to chunk data pieces that belong to a chunk group with a group number "3".

Upon receiving a request to write a new file or update an existing file from the NAS client 210, the NAS service processing unit 121 splits actual data of the file into chunks. FIG. 7 depicts an example where actual data of a file is split into thirteen chunks. Data pieces of the chunks are individually denoted by data D1 to D13, sequentially from the beginning of the file. For ease of explanation, suppose that the content of the individual data D1 to D13 is all different (that is, there is no duplication among them). In this case, chunk data pieces individually corresponding to the data D1 to D13 are separately stored in the storing unit 110.

Each chunk data piece is assigned a group number (gno) and an index number (gindex) in a chunk group indicated by the group number. Such index numbers are given to chunk data pieces with no duplicates, sequentially in the order that the chunk data pieces are created by splitting the file. In addition, when the total size of chunk data pieces assigned the same group number has reached a certain limit, the group number is incremented by 1 and the following chunk data piece is then assigned the incremented group number.

Note here that the state of a chunk group whose total size of chunk data pieces has not yet reached the certain limit is here referred to as its "active" state, where the chunk group is able to accommodate a subsequent chunk data piece. On the other hand, the state of a chunk group whose total size of chunk data pieces has reached the certain limit is referred to as its "inactive" state, where the chunk group is no longer able to accommodate an additional chunk data piece.

Referring to the example of FIG. 7, first, the data D1 to D5 is assigned to the chunk group with the group number "1". Assume that, at this stage, the total size of the chunk group with the group number "1" has reached the certain limit and, therefore, the chunk group goes into inactive state. Subsequently, the following data D6 is assigned to a new chunk group with a group number "2".

Assume that, subsequently, the data D6 to D11 is assigned to the chunk group with the group number "2", and at this stage, this chunk group goes into inactive state. Then, the following data D12 is assigned to a new chunk group with a group number "3". According to the example of FIG. 7, although the data D12 and D13 is assigned to the chunk group with the group number "3", this chunk group is still in active state at this stage. In this case, a chunk data piece to be generated next (not illustrated) will be assigned the group number "3" and an index number "3".

An inactive chunk group is a data unit used to transfer actual data of a file to the cloud storage 240. When a chunk group goes into inactive state, one chunk group object 131 is generated by the cloud transfer processing unit 125 from the chunk group. As for the chunk group object 131, for example, the group number of its corresponding chunk group is set as the object name, and individual chunk data pieces included in the chunk group are set as the object value. The chunk group object 131 generated in this manner is transferred from the cloud transfer processing unit 125 to the cloud storage 240.

FIG. 8 illustrates a data structure example of a deletion counter table. The deletion counter table 116 is a management table for holding deletion counter values. The deletion counter table 116 contains records with entries in columns named "gno" and "delcnt". The records are associated one-to-one with data groups each managed by a different Bloom filter in the bottom level of the hierarchical Bloom filter 117. Therefore, the deletion counter table 116 includes as many records as the number of bottom Bloom filters. Note that each data group includes chunk data pieces belonging to a maximum of twenty chunk groups, as described later.

Each entry in the "gno" column indicates group numbers of individual chunk groups belonging to the associated data group. Each entry in the "delcnt" column indicates the deletion counter value corresponding to the associated data group. The deletion counter value indicates, among the chunk data pieces included in the data group, the number of invalid chunk data pieces with the reference counter reading "0". As described later, the deletion counter value is used to determine whether garbage collection needs to be performed on individual chunk groups belonging to the associated data group.

Note that each record in the deletion counter table 116 may include an identification number for identifying the associated data group, in place of the entry in the "gno" column.

Next described are chunk data lookup operations using the hierarchical Bloom filter 117 and the binary tree lookup data 118. First, the chunk data lookup operation using the hierarchical Bloom filter 117 is explained, with reference to FIGS. 9 and 10.

Figure 9:
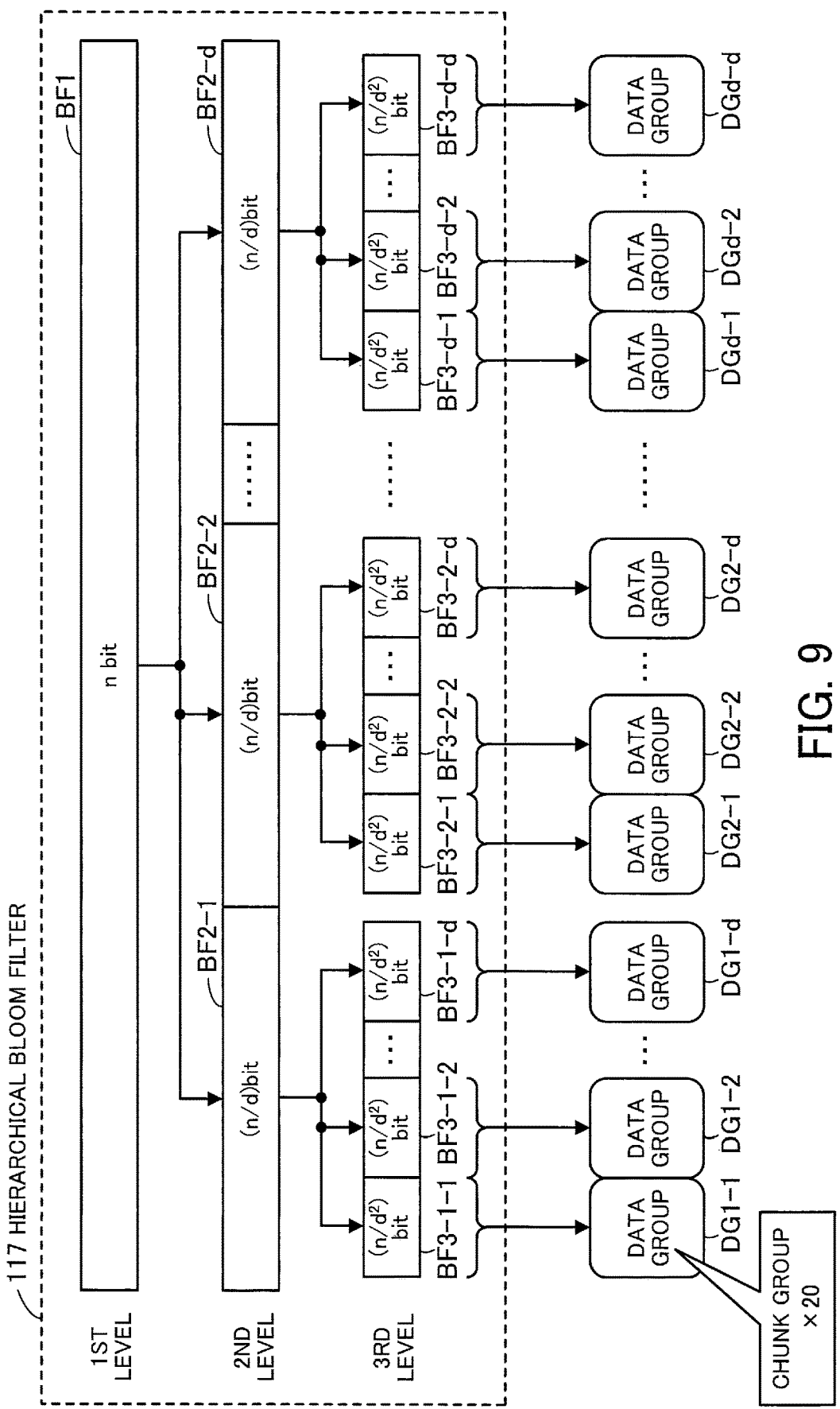
FIG. 9 illustrates a structure example of a hierarchical Bloom filter.

FIG. 9 illustrates a structure example of a hierarchical Bloom filter. The hierarchical Bloom filter 117 consists of a set of Bloom filters in a plurality of hierarchical levels. Each Bloom filter is a bit array of a predetermined number of bits.

According to this embodiment, a single n-bit Bloom filter BF1 is provided in the uppermost level (first level). The number of bits "n" is determined according to the maximum number of query-target elements (i.e., the maximum number of chunk data pieces stored in the chunk data table 115 of the storing unit 110).

In each level below the first level, d times as many Bloom filters as in its immediate upper level are provided, and each of the Bloom filters includes (1/d) as many bits as in the upper level. Therefore, the total number of bits in Bloom filters in each level is the same, i.e., n bits. Thus, the hierarchical Bloom filter 117 takes up storage space corresponding to the number of bits obtained by multiplying the number of hierarchical levels by n.

Assume in this embodiment that the hierarchical Bloom filter 117 consists of three levels, for example. In this case, d Bloom filters BF2-1, BF2-2, . . . , BF2-$d$ are provided in the second level, as illustrated in FIG. 9. Each of the Bloom filters BF2-1, BF2-2, . . . , BF2-$d$ is a bit array of (n/d) bits.

In the third level, d Bloom filters are provided below each of the Bloom filters BF2-1, BF2-2, . . . , BF2-$d$ in the second level. For example, below the Bloom filter BF2-1, d Bloom filters BF3-1-1, BF3-1-2, . . . , BF3-1-$d$ are formed. Below the Bloom filter BF2-2, d Bloom filters BF3-2-1, BF3-2-2, . . . , BF3-2-$d$ are formed. Below the Bloom filter BF2-$d$, d Bloom filters BF3-$d$-1, BF3-$d$-2, . . . , BF3-$d$-$d$ are formed. Thus, there are $d^2$ Bloom filters in total provided in the third level. Each of these Bloom filters is a bit array of $(n/d^2)$ bits.

Note that each Bloom filter in the third level illustrated in FIG. 9 is an example of the Bloom filter 3 of FIG. 1.

Each of the Bloom filters BF3-1-1, BF3-1-2, . . . , BF3-1-$d$ in the third level is assigned a query-target data group. For example, the Bloom filters BF3-1-1, BF3-1-2, . . . , BF3-1-$d$ are assigned data groups DG1-1, DG1-2, . . . , DG1-$d$, respectively, as a query target. The Bloom filters BF3-2-1, BF3-2-2, . . . , BF3-2-$d$ are assigned data groups DG2-1, DG2-2, . . . , DG2-$d$, respectively, as a query target. The Bloom filters BF3-$d$-1, BF3-$d$-2, . . . , BF3-$d$-$d$ are assigned data groups DGd-1, DGd-2, . . . , DGd-$d$, respectively, as a query target. Each of these data groups includes chunk data pieces belonging to a maximum of 20 chunk groups.

For each Bloom filter in the second level, its query target is all the query-target data groups assigned to individual Bloom filters located below the Bloom filter. For example, the query target of the Bloom filter BF2-1 is the data groups DG1-1, DG1-2, . . . , DG1-d. Similarly, for the Bloom filter BF1 in the first level, its query target is all the query-target data groups associated with the individual Bloom filters BF2-1, BF2-2, . . . , BF2-d located below the Bloom filter BF1. In other words, the query target of the Bloom filter BF1 in the first level is all chunk data pieces stored in the chunk data table 115.

Each time an inactive chunk group appears, chunk data pieces belonging to the chunk group are added to a data group. For example, when a first inactive chunk group appears, chunk data pieces belonging to the chunk group are added to the first data group DG1-1. Subsequently, with the emergence of each inactive chunk group, chunk data pieces are progressively added to the data group DG1-1 until the number of chunk groups whose chunk data pieces have been added to the data group DG1-1 reaches twenty. Then, when the twenty-first inactive chunk group appears, chunk data pieces belonging to the chunk group are added to the next data group DG1-2. Herewith, each data group includes chunk data pieces belonging to a maximum of twenty chunk groups.

Note that the Bloom filters included in the hierarchical Bloom filter 117 are used to determine whether the same chunk data piece as data included in each chunk generated by splitting a file is included in a data group. In view of the purpose of the lookup operation considered from the perspective of the entire deduplication processing, elements included in the query-target data groups of the Bloom filters are referred to as "chunk data pieces" in this description. Note however that direct query targets of the Bloom filters are individual hashes calculated based on these chunk data pieces. That is, to be precise, the Bloom filters are used to determine whether the same hash as a hash calculated based on the data of each chunk generated by splitting the file is included in a data group. Therefore, the elements included in the query-target data groups are, in reality, individual hashes calculated based on chunk data pieces. Note that these hashes are values registered in the "hash" column of the chunk meta-table 113.

Figure 10:
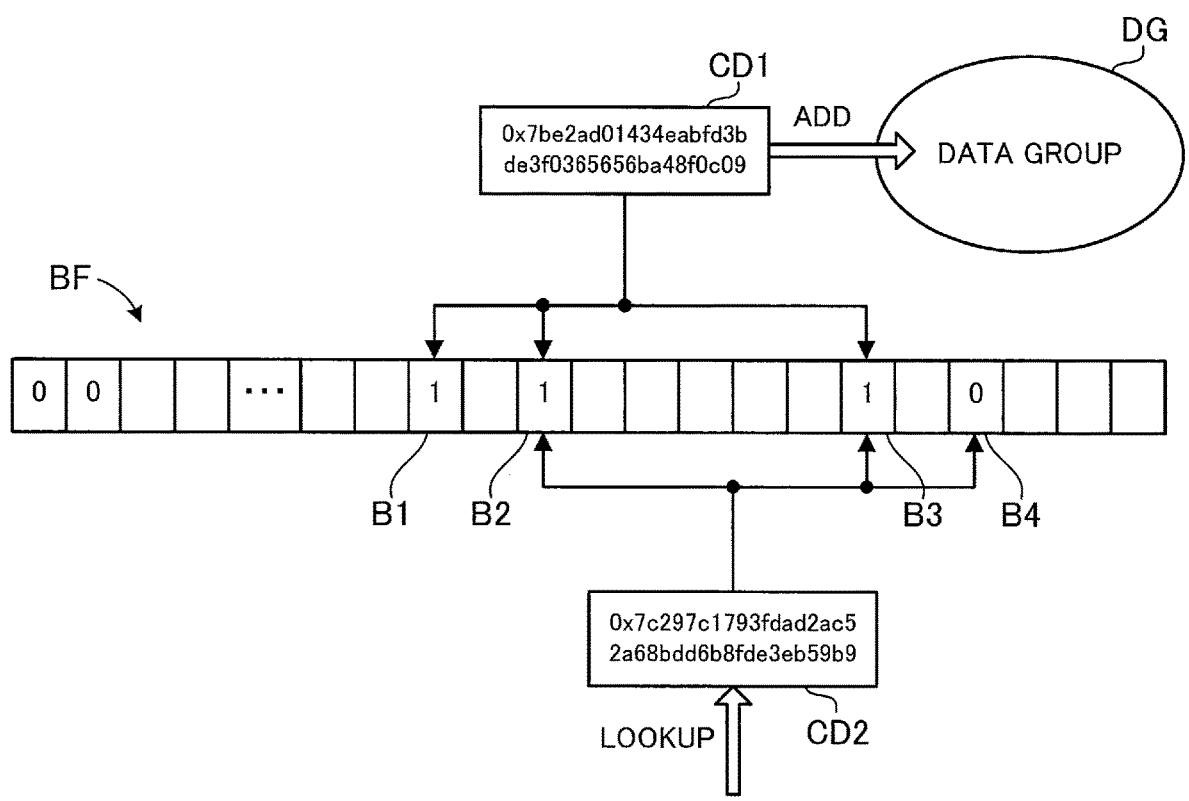
FIG. 10 illustrates a processing example using a Bloom filter.

FIG. 10 illustrates a processing example using a Bloom filter. With reference to FIG. 10, any one of the Bloom filters included in the hierarchical Bloom filter 117 is denoted by "Bloom filter BF", and a description is here given of processing carried out by the Bloom filter processing unit 122 with the use of the Bloom filter BF. Note that individual bits in all the Bloom filters included in the hierarchical Bloom filter 117 are all set to "0" in initial state prior to insertion of chunk data pieces to a query-target data group.

First described is a case of adding a chunk data piece CD1 to a data group DG which has been assigned to the Bloom filter BF as a query target. In this case, the Bloom filter processing unit 122 first calculates a hash HA1 based on the chunk data piece CD1. Then, the Bloom filter processing unit 122 applies k hash functions to the hash HA1 to thereby calculate k hashes, and identifies, based on the calculated k hashes, k bit positions to be set to "1".

In the example of FIG. 10, let the number of hash functions (k) to be 3. Therefore, three hash functions are individually applied to the hash HA1 calculated based on the chunk data piece CD1, to thereby obtain three hashes. Each of these hashes is divided by the number of bits in the Bloom filter BF, to obtain the remainder of the division. The three remainders thus obtained are identified as bit positions with values to be set to "1". Supposing in the example of FIG. 10 that bits B1, B2, and B3 are identified, the Bloom filter processing unit 122 sets these bits B1, B2, and B3 to "1".

Next described is a case of determining whether a chunk data piece CD2 generated by splitting a file is included in the data group DG. In this case, the Bloom filter processing unit 122 first calculates a hash HA2 based on the chunk data piece CD2 by the same calculation procedure described above. Then, the Bloom filter processing unit 122 identifies bit positions to be "1" based on hashes obtained by individually applying k hash functions to the hash HA2. Supposing in the example of FIG. 10 that the bits B2 and B3 and a bit B4 are identified, the Bloom filter processing unit 122 acquires values of the bits B2, B3, and B4 from the Bloom filter BF.

If the values of the bits B2, B3, and B4 are all "1", it is interpreted as possible presence of the chunk data piece DC2 in the data group DG. This, however, does not mean that assured presence of the chunk data piece CD2 in the data group DG is guaranteed (false positive). On the other hand, at least one of the bits B2, B3, and B4 is "0", it is interpreted as definite absence of the chunk data piece CD2 from the data group DG.

As for the hierarchical Bloom filter 117, in the case of adding a chunk data piece, bit value update (to "1") starts from the bottom Bloom filter and proceeds sequentially up. Referring to the example of FIG. 9, suppose a case of adding a chunk data piece to the data group DG1-1. First, in the third level, appropriate three bit positions in the Bloom filter BF3-1-1, to which the data group DG1-1 has been assigned, are updated to "1". Then, in the next upper level (i.e., the second level), appropriate three bit positions in the Bloom filter BF2-1 are updated to "1". Further, in the next upper level (the first level), appropriate three bit positions in the Bloom filter BF1 are updated to "1".

On the other hand, in the case of running a membership test of a chunk data piece, bit value reference starts from the uppermost Bloom filter BF1 and proceeds sequentially down. That is, first, the Bloom filter BF1 in the first level is referenced to determine whether three bit positions identified by hash calculations are all "1". If all the three bit positions are "1", then, for each of the Bloom filters BF2-1, BF2-2, . . . , BF2-d in the second level, it is determined whether three bit positions identified by hash calculations are all "1".

Suppose that, for example, the identified three bit positions are all "1" in the Bloom filter BF2-1. In this case, for each of the Bloom filters BF3-1-1, BF3-1-2, . . . , BF3-1-d in the level below the Bloom filter BF2-1 (i.e., the third level), it is determined whether three bit positions identified by hash calculations are all "1".

Then, suppose that, for example, the identified three bit positions are all "1" in the Bloom filter BF3-1-1. In this case, the queried chunk data piece is determined to be possibly present in the data group DG1-1 assigned to the Bloom filter BF3-1-1.

Using the above-described bloom filter with a hierarchical structure, the Bloom filter processing unit 122 is able to narrow the search to a data group possibly including a queried chunk data piece amongst a vast number of chunk data pieces. Subsequently, in the cloud storage gateway 100, the binary tree lookup unit 123 provides an accurate determination of whether the queried chunk data piece is present in the selected data group.

That is, the data group narrowing using the hierarchical Bloom filter 117 is performed prior to binary tree lookup. This reduces the number of comparisons that need to be subsequently made in the binary tree lookup between a hash based on data of a chunk generated by splitting a file and a hash based on a chunk data piece stored in the storing unit 110. As a result, it is possible to improve the processing efficiency in determining the presence or absence of a duplicate chunk data piece.

Figure 11:
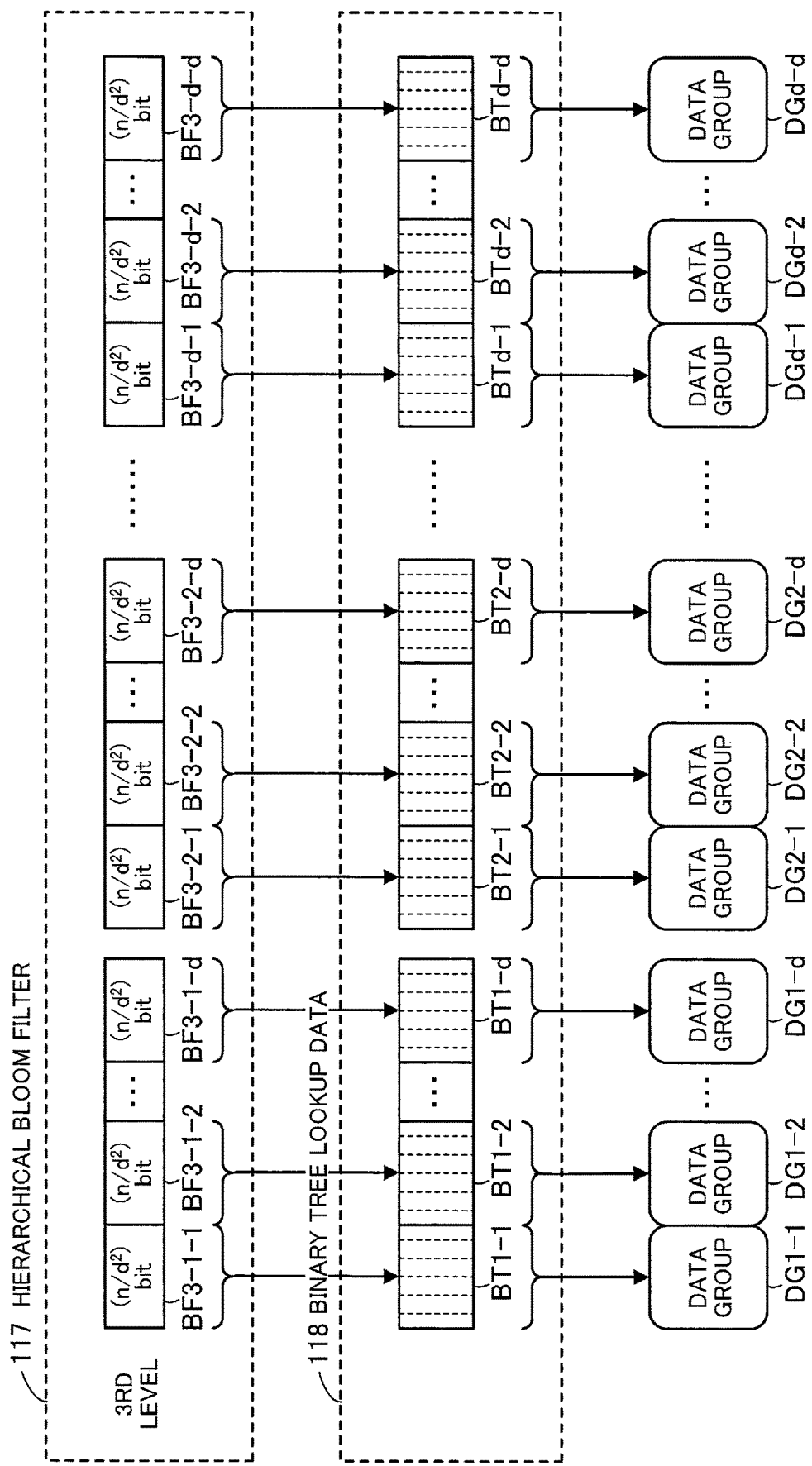
FIG. 11 illustrates a structure example of binary tree lookup data.

Next described is a binary tree lookup operation using the binary tree lookup data 118, with reference to FIG. 11. FIG. 11 illustrates a structure example of binary tree lookup data.

The binary tree lookup data 118 includes tree structure datasets BT1-1, BT1-2, . . . , BT1-$d$, BT2-1, BT2-2, . . . , BT2-$d$, BTd-1, BTd-2, . . . , BTd-$d$ corresponding to the data groups DG1-1, DG1-2, . . . , DG1-$d$, DG2-1, DG2-2, . . . , DG2-$d$, DGd-1, DGd-2, . . . , DGd-$d$, respectively.

Each tree structure dataset indicates the structure of a binary search tree used to search chunk data pieces included in the corresponding data group. For example, the tree structure dataset has entries corresponding to individual nodes included in the binary search tree. Each node is associated with a chunk data piece included in the data group, by values registered in the "gno" and "gindex" fields of the corresponding entry. In addition, information registered in the entries corresponding to the nodes defines the structure of the binary search tree.

As mentioned above, direct query targets of the Bloom filters are individual hashes calculated based on chunk data pieces. This is also true for binary tree lookup, and direct query targets in the lookup operation using a tree structure dataset are hashes calculated based on corresponding chunk data pieces. Therefore, the tree structure of each binary search tree is defined based on the hashes of the corresponding chunk data pieces. Specifically, a child node on one side of a given node and all descendant nodes of this child node have hashes smaller than that of the given node. On the other hand, a child node on the other side and all descendant nodes of this child node have hashes larger than that of the given node.

The tree structure dataset is updated each time a chunk data piece is added to the corresponding data group. In the update, an entry of a node corresponding to the chunk data piece is newly added, and connections between nodes are redefined based on the hash of the chunk data piece.

Note that FIG. 11 also depicts mappings between the individual tree structure datasets of the binary tree lookup data 118 and the individual Bloom filters in the third level of the hierarchical Bloom filter 117. The tree structure datasets BT1-1, BT1-2, . . . , BT1-$d$, BT2-1, BT2-2, . . . , BT2-$d$, BTd-1, BTd-2, . . . , BTd-$d$ are associated with the Bloom filters BF3-1-1, BF3-1-2, . . . , BF3-1-$d$, BF3-2-1, BF3-2-2, . . . , BF3-2-$d$, . . . , BF3-$d$-1, BF3-$d$-2, . . . , BF3-$d$-$d$, respectively.

Suppose that the possible presence of a queried chunk data piece in a data group corresponding to a given Bloom filter in the third level has been determined using this Bloom filter. In this case, a binary tree lookup operation is performed using a tree structure dataset associated with the Bloom filter, to make an accurate determination of whether the queried chunk data piece is actually present in the corresponding data group. For example, assume that the possible presence of a queried chunk data piece in the data group DG1-1 has been determined using the Bloom filter BF3-1-1. In this case, whether the queried chunk data piece is present in the data group DG1-1 is determined using the tree structure dataset BT1-1 associated with the Bloom filter BF3-1-1.

Note that the above-described binary tree lookup operation using the binary tree lookup data 118 is simply an example of how to accurately determine the presence or absence of a queried chunk data piece in a data group. The cloud storage gateway 100 may use a different method to achieve the same effect.

Next described is a filter storage space reduction process.

The number of bits in each Bloom filter of the hierarchical Bloom filter 117 depends on the number of query-target elements (i.e., the number of chunk data pieces). The number of bits in each Bloom filter increases with a greater number of query-target elements. As a result, data constituting the hierarchical Bloom filter 117 takes up increased storage space in the storing unit 110. For example, in the case of taking 4 kilobytes to manage one bit of information, the amount of data constituting the Bloom filter BF1 in the first level may reach about 330 megabytes. In this case, the hierarchical Bloom filter 117 with three levels takes up as much storage space as about 1 gigabyte.

Note that Bloom filters are generally characterized by their intrinsic inability to reduce the number of bits therein even though the number of query-target elements has been reduced. This is because it is not possible to simply remove bits with a value of "1", determined by calculation to be associated with deleted elements, since those bits could have been set to "1" by another element or some combination of other elements. Therefore, removing those associated bits from a Bloom filter possibly introduces false negatives in subsequent lookup operations using the Bloom filter.

In view of the above-mentioned problem, the cloud storage gateway 100 of this embodiment employs the following scheme. First, garbage collection is performed on a chunk group basis, which allows a reduction in the number of chunk data pieces (i.e., the number of elements) included in a data group. Following that, a relative number of bits corresponding to the proportion of the number of chunk data pieces deleted from the data group are deleted from the high order end of a Bloom filter corresponding to the data group. Then, in a lookup operation using the Bloom filter with a reduced number of bits, as many bits as those deleted are virtually added to the high order end of the Bloom filter before a lookup is performed. The added bits are all set to "1", thus preventing false negatives.

Figure 12:
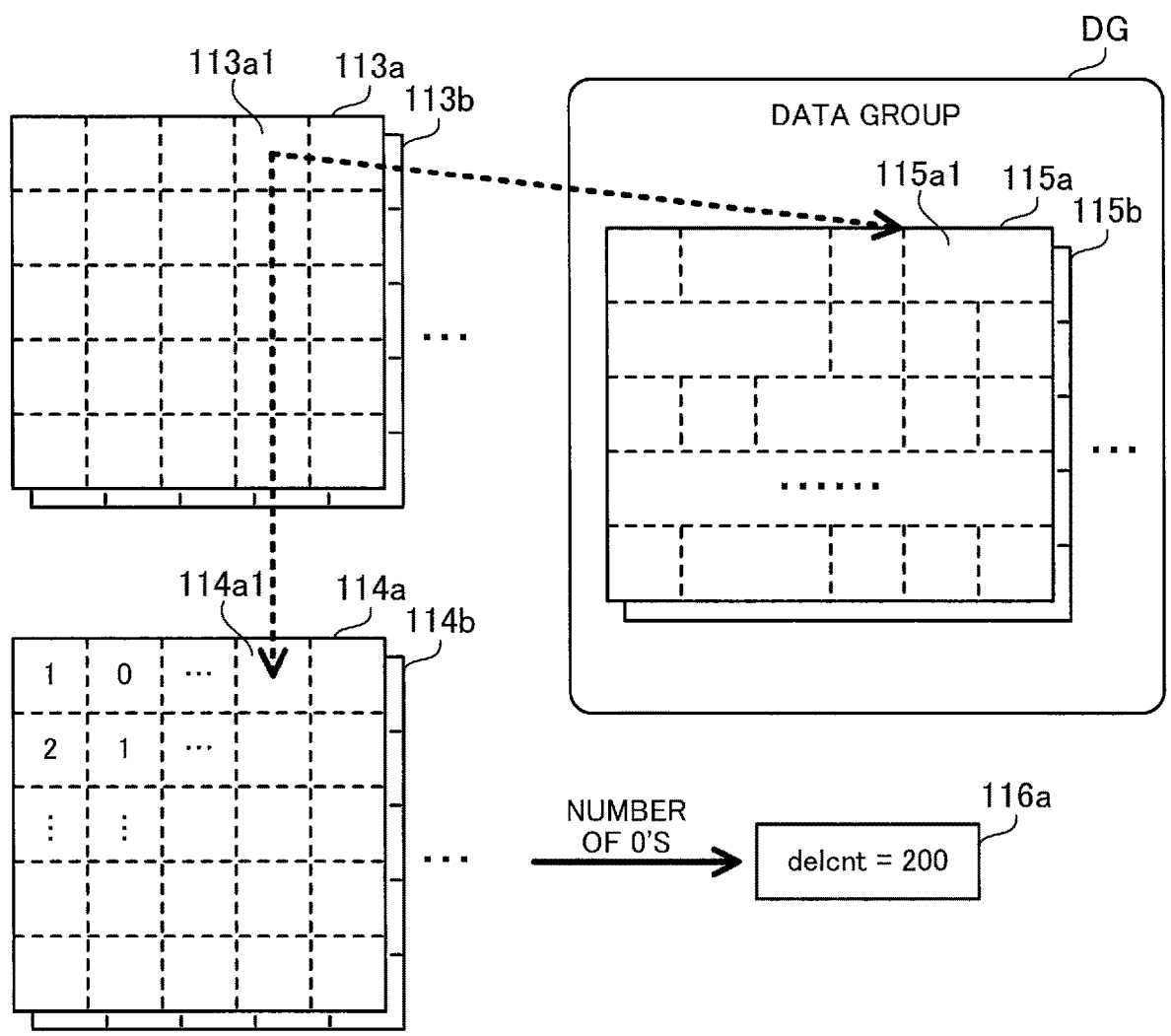
FIG. 12 illustrates a relationship between various tables corresponding to one data group and various count values.
Figure 13:
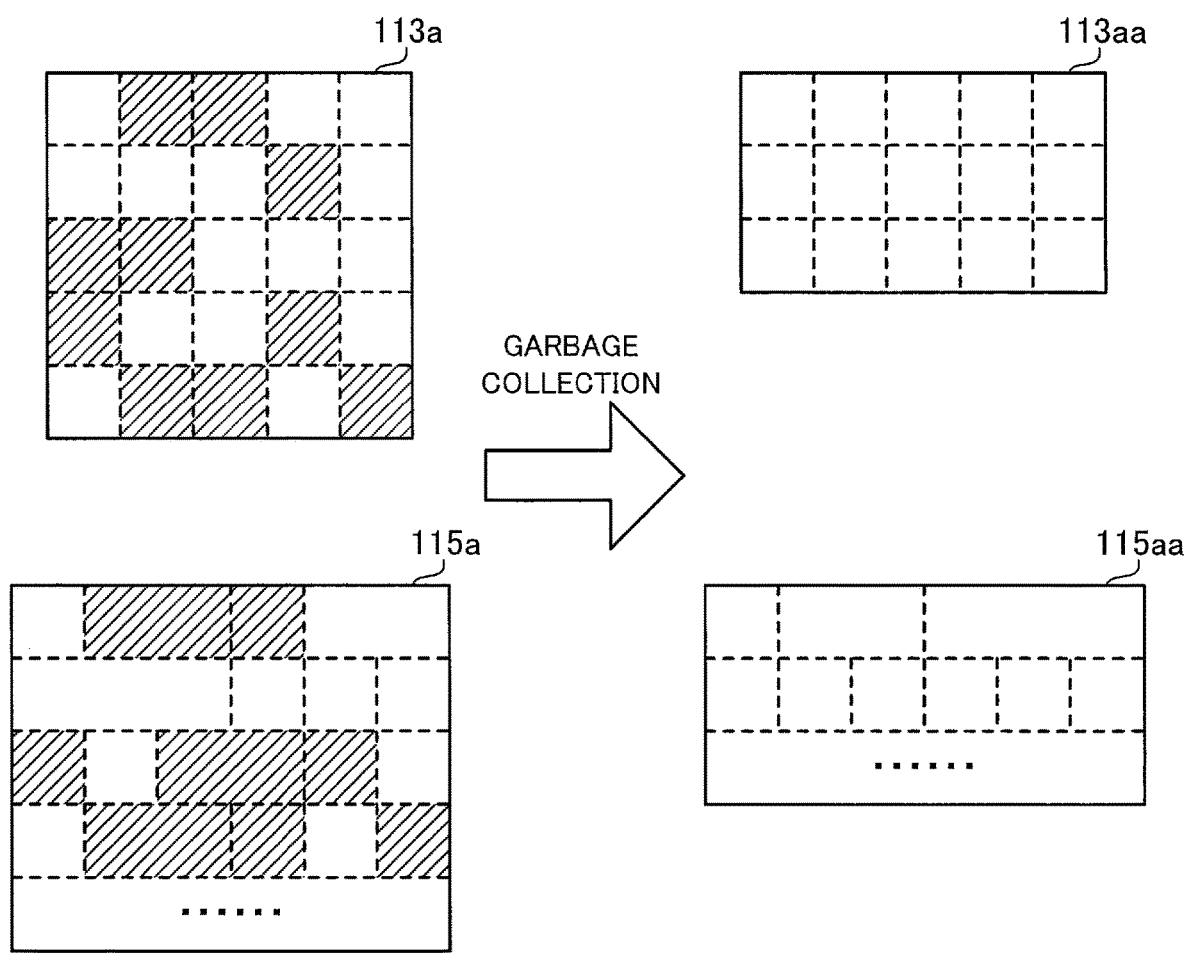
FIG. 13 illustrates garbage collection.
Figure 14:
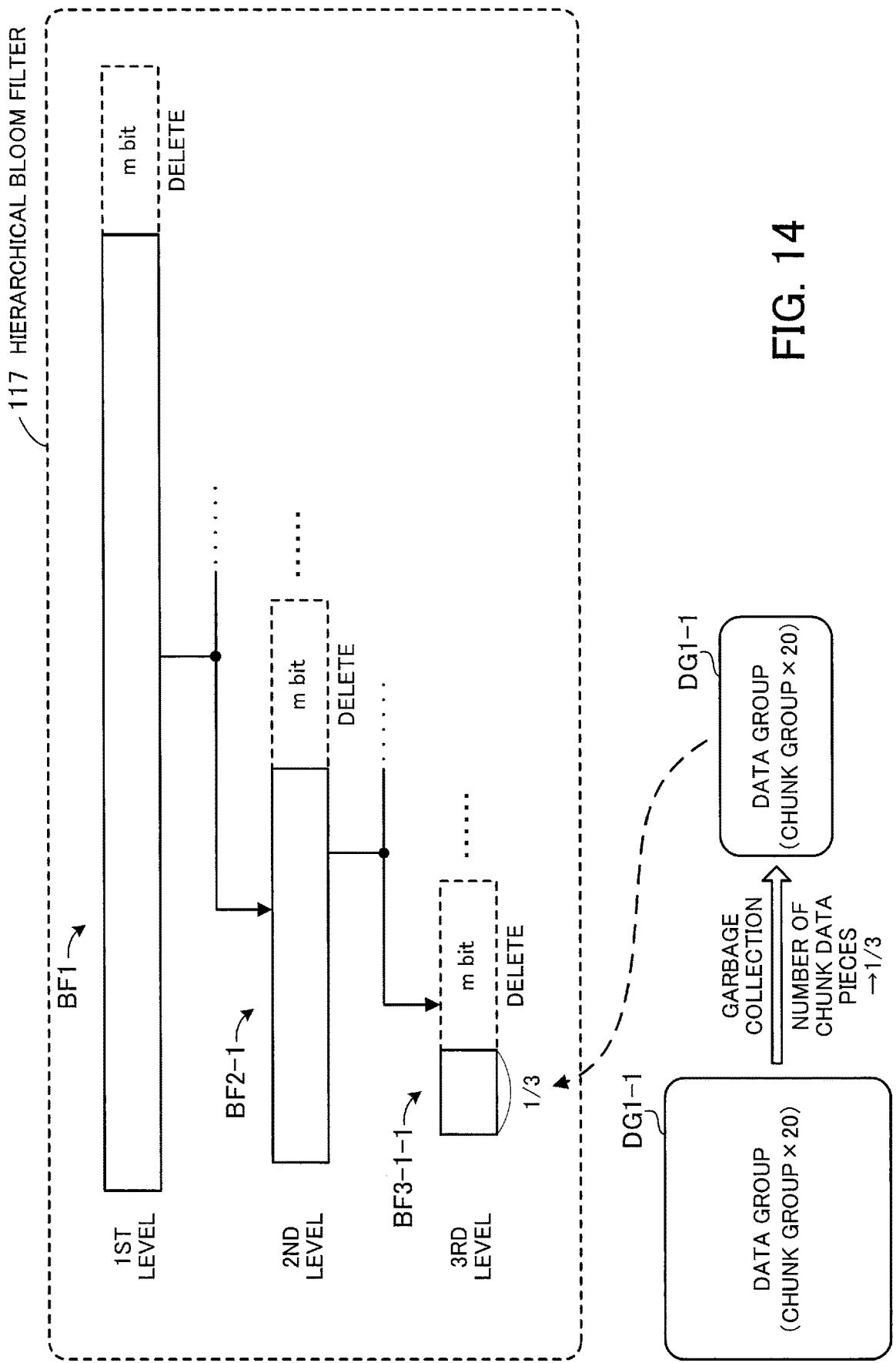
FIG. 14 illustrates an example of a bit number reduction process for Bloom filters.
Figure 15:
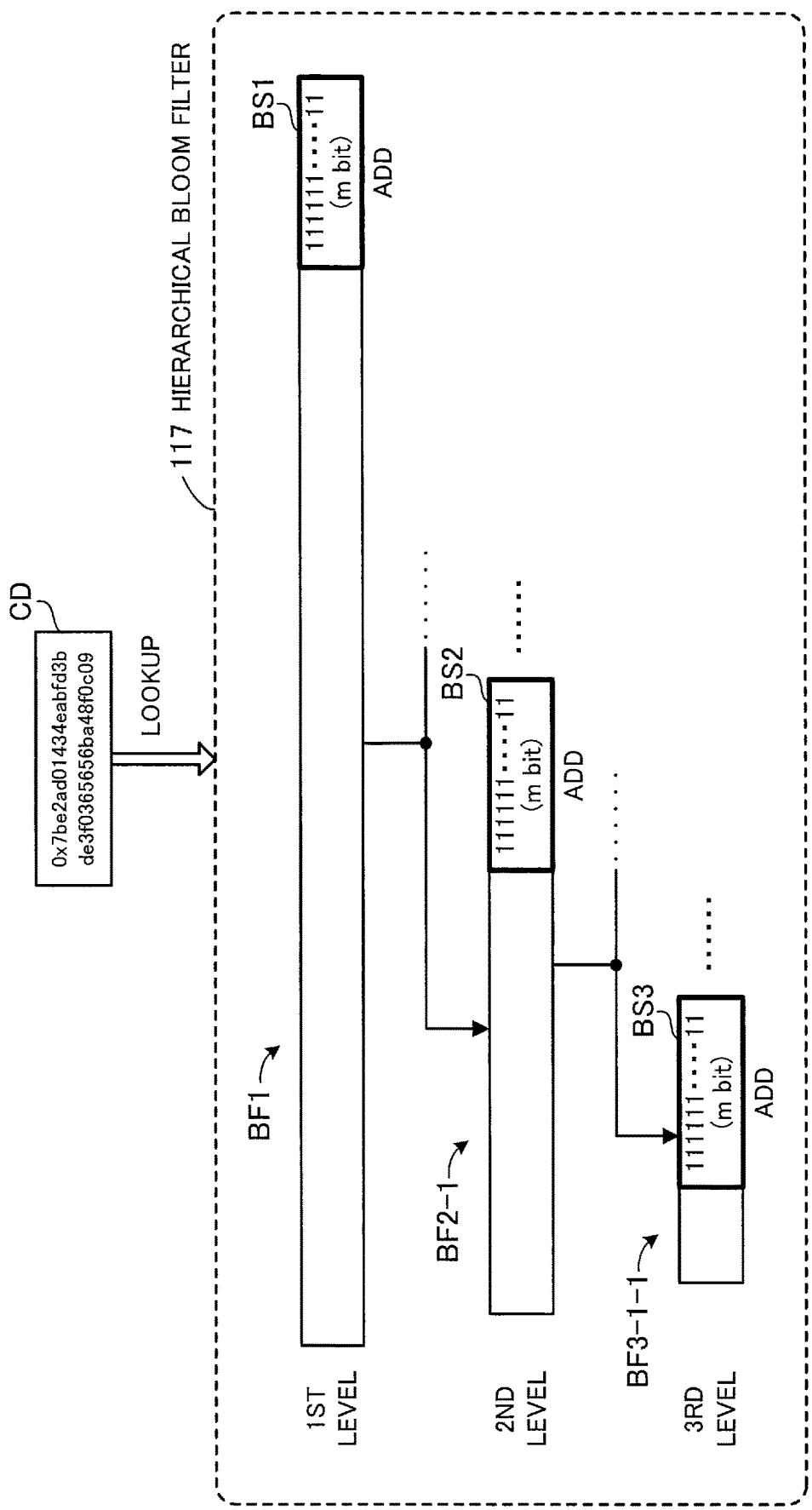
FIG. 15 illustrates an example of a lookup operation using Bloom filters each with a reduced number of bits.

The following describes a mechanism for performing garbage collection with reference to FIGS. 12 and 13, and then describes a process of allowing a reduction in storage space consumed by the hierarchical Bloom filter 117 with reference to FIGS. 14 and 15.

FIG. 12 illustrates a relationship between various tables corresponding to one data group and various count values.

Storage spaces 115$a$, 115$b$, and so on depicted in FIG. 12 are chunk data storage spaces individually dedicated to each chunk group. Each of these storage spaces 115$a$, 115$b$, and so on corresponds to a set of records of a single chunk group included in the chunk data table 115. In the storage spaces 115$a$, 115$b$, and so on, each section defined by a dashed line represents a storage area for one chunk data piece. Since a maximum of twenty chunk groups belong to one data group (here referred to as "data group DG"), the data group DG includes up to twenty storage spaces described above.

Each of tables 113$a$, 113$b$, and so on depicted in FIG. 12 corresponds to a set of records of a single chunk group included in the chunk meta-table 113. In the tables 113$a$, 113$b$, and so on, each section defined by a dashed line represents a record corresponding to one chunk data piece. In addition, the tables 113$a$, 113$b$, and so on are associated with the storage spaces 115$a$, 115$b$, and so on, respectively.

Each of tables 114$a$, 114$b$, and so on depicted in FIG. 12 corresponds to a set of records of a single chunk group included in the reference counter table 114. In the tables 114a, 114b, and so on, each section defined by a dashed line contains a reference counter value (the value registered in the "refcnt" column) registered in a record corresponding to a single chunk data piece. In addition, the tables 114a, 114b, and so on are associated with the storage spaces 115a, 115b, and so on, respectively.

Values registered in the records of the tables 113a, 113b, and so on allow access to chunk data pieces and reference counter values. For example, values in the "gno" and "offset" fields (or values in the "gno" and "gindex" fields), registered in a record 113a1 of the table 113a, allow access to a chunk data piece 115a1 included in the storage space 115a. In addition, the values in the "gno" and "gindex" fields, registered in the record 113a1, allow access to a corresponding reference counter value registered in a record 114a1 of the table 114a.

As described above, each reference counter indicates how many chunks refers to its corresponding chunk data piece. In response to a request for updating or deleting a file, each reference counter that was associated with a chunk of the file before the update or deletion may be decremented. Then, when the reference counter reaches "0", the corresponding chunk data piece is no longer referenced by chunks of any files and thus becomes invalid.

According to this embodiment, the deletion counter table 116 holds a deletion counter value for each data group. Each deletion counter indicates, amongst chunk data pieces included in the corresponding data group, the number of chunk data pieces, the reference counters of which read "0". FIG. 12 illustrates a deletion counter 116a corresponding to the data group DG. The value of the deletion counter 116a indicates the number of reference counters with "0" amongst all the reference counters registered in the tables 114a, 114b, and so on corresponding to the data group DG.

When the deletion counter exceeds a predetermined value, it is interpreted as the corresponding data group including a lot of invalid chunk data pieces. In this case, it is considered that a lot of wasted space no longer referenced by any chunks is present in the storage space of the data group. Therefore, when the deletion counter exceeds the predetermined value, the filter storage space reducing unit 124 performs garbage collection on each chunk group belonging to the corresponding data group.

FIG. 13 illustrates garbage collection. Garbage collection is a process of freeing up storage space used by invalid chunk data pieces by collecting fragmented valid chunk data pieces together to the same storage space, as mentioned above.

FIG. 13 depicts the table 113a corresponding to a given chunk group and the storage space 115a for chunk data pieces corresponding to this chunk group. Note that the table 113a constitutes part of the chunk meta-table 113. In the table 113a, shaded sections indicate records of chunk data pieces with the reference counters reading "0". In the storage space 115a, shaded sections indicate storage area of invalid chunk data pieces with the reference counters reading "0". Thus, prior to garbage collection, unwanted area with invalid chunk data pieces stored therein is found in parts within the storage space 115a while area with valid chunk data pieces is fragmented.

The filter storage space reducing unit 124 rearranges, in a continuous storage space 115aa, the valid chunk data pieces stored in the storage space 115a. Herewith, the area used to store the invalid chunk data pieces is released and made available for other data to be written. In addition, according to the rearrangement of the valid chunk data pieces, the filter storage space reducing unit 124 rewrites appropriately information registered in the table 113a, corresponding to these chunk data pieces. For example, the individual chunk data pieces rearranged in the storage space 115aa are reassigned new index numbers (gindex) in descending order, sequentially from the beginning, and their original index numbers are rewritten with the newly assigned ones. Further, the offset corresponding to each of the chunk data pieces is also rewritten. Supposing that in FIG. 13, the number of chunk data pieces in the chunk group is reduced to three-fifths after garbage collection, the size of the table 113a is also reduced to three-fifths, as depicted by a table 113aa.

Also in the chunk map table 112, the reference counter table 114, and the chunk data table 115, the index numbers in records corresponding to the individual chunk data pieces are rewritten in the same manner described above.

According to the above-described procedure, garbage collection is performed on each chunk group belonging to a data group, which achieves a reduction in storage space consumed by the data group. Subsequently, the filter storage space reducing unit 124 performs a process of reducing the number of bits in Bloom filters included in the hierarchical Bloom filter 117 according to the reduction in the data group.

FIG. 14 illustrates an example of a bit number reduction process for Bloom filters. Suppose in FIG. 14 that, for example, garbage collection has been performed on the data group DG1-1 and the number of chunk data pieces (the number of elements) included in the data group DG1-1 has been reduced to one-third.

In this case, the filter storage space reducing unit 124 first reduces the number of bits in the Bloom filter BF3-1-1, to which the data group DG1-1 is assigned as a query target, amongst the bottom Bloom filters (in the third level) of the hierarchical Bloom filter 117. In this operation, within the Bloom filter BF3-1-1, one-third of the bit array at the low order end is left unaltered while the remaining two-thirds at the high order end is deleted from the storing unit 110. Assume that at this time, an m-bit array is deleted from the Bloom filter BF3-1-1.

Next, the filter storage space reducing unit 124 reduces the number of bits in the Bloom filter BF2-1, which is located directly above the Bloom filter BF3-1-1. In this operation, within the Bloom filter BF2-1, an m-bit array at the high order end is deleted from the storing unit 110 while the remaining bit array is left unaltered. Note that no bit number reduction is performed for other Bloom filters in the second level.

Further, the filter storage space reducing unit 124 reduces the number of bits in the Bloom filter BF1, which is located directly above the Bloom filter BF2-1. In this operation, within the Bloom filter BF1, an m-bit array at the high order end is deleted from the storing unit 110 while the remaining bit array is left unaltered, as in the case of the second level.

The above-described procedure enables a reduction in storage space consumed by the hierarchical Bloom filter 117 according to a reduction in storage space for a data group.

FIG. 15 illustrates an example of a lookup operation using Bloom filters each with a reduced number of bits. FIG. 15 depicts a case where a lookup request for a chunk data piece CD is made after the number of bits in each of the Bloom filters BF1, BF2-1, and BF3-1-1 is reduced by the procedure described in FIG. 14.

In this case, first, a membership test of the chunk data piece CD is performed using the Bloom filter BF1 in the first level. At this time, the Bloom filter processing unit 122 virtually adds, at the high order end of the Bloom filter BF1, a bit array BS1 of m bits, which equals to the number of bits deleted. All bits of the added bit array BS1 are set to "1". Using the Bloom filter BF1 to which the bit array BS1 is added, the Bloom filter processing unit 122 runs the membership test to determine if the chunk data piece CD is included in query-target data groups associated with the Bloom filter BF1.

If this membership test determines possible presence of the chunk data piece CD in the query-target data groups, a membership test of the chunk data piece CD is performed using each of the Bloom filters BF2-1, BF2-2, . . . , BF2-d in the second level. At this time, in the membership test using the Bloom filter BF2-1, the Bloom filter processing unit 122 virtually adds, at the high order end of the Bloom filter BF2-1, a bit array BS2 of m bits, which equals to the number of bits deleted. As in the case of the bit array BS1, all bits of the added bit array BS2 are set to "1". Using the Bloom filter BF2-1 to which the bit array BS2 is added, the Bloom filter processing unit 122 runs the membership test to determine if the chunk data piece CD is included in query-target data groups associated with the Bloom filter BF2-1.

Suppose that this membership test with the Bloom filter BF2-1 determines possible presence of the chunk data piece CD in the query-target data groups. In this case, a membership test of the chunk data piece CD is then performed using each of the Bloom filters BF3-1-1, BF3-1-2, . . . , BF3-1-d located directly below the Bloom filter BF2-1. At this time, in the membership test using the Bloom filter BF3-1-1, the Bloom filter processing unit 122 virtually adds, at the high order end of the Bloom filter BF3-1-1, a bit array BS3 of m bits, which equals to the number of bits deleted. As in the case of the bit arrays BS1 and BS2, all bits of the added bit array BS3 are set to "1". Using the Bloom filter BF3-1-1 to which the bit array BS3 is added, the Bloom filter processing unit 122 runs the membership test to determine if the chunk data piece CD is included in a query-target data group associated with the Bloom filter BF3-1-1.

As described above, when a membership test is run using a Bloom filter with a reduced number of bits, a bit array having the same number of bits as a deleted bit array, with all bits set to "1", is virtually added to the high order end of the Bloom filter. Then, using the Bloom filter with the bit array added in this manner, the membership test is performed. This prevents a fatally erroneous determination (that is, an element that is actually a member of the set is rejected by the membership test) from being made in a lookup operation, while reducing the amount of actual data of Bloom filters stored in the storing unit 110 and thus increasing the use efficiency of the storing unit 110.

Note that if, although garbage collection has reduced the number of chunk data pieces included in a data group, a Bloom filter assigned the data group as a query target is used in subsequent lookup operations without alteration, the possibility of false positives may increase. However, the chance of false positives is lowered by reducing the number of bits in the associated Bloom filter, in the above described manner, according to the reduction in the number of chunk data pieces included in the data group.

Next described are processes carried out by the cloud storage gateway 100, with reference to flowcharts.

Figure 16:
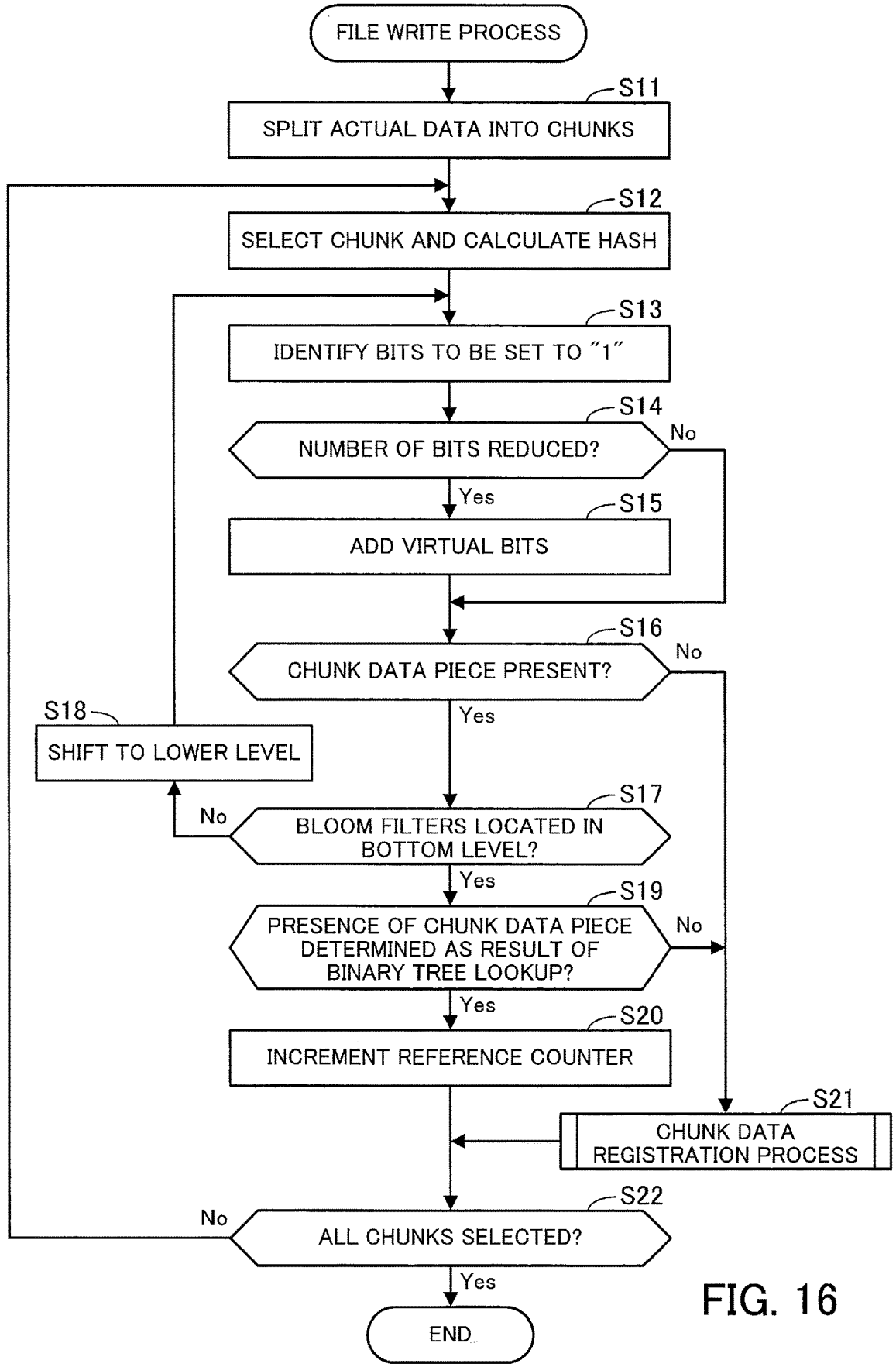
FIG. 16 is a flowchart illustrating an example of a file write process.

FIG. 16 is a flowchart illustrating an example of a file write process. Upon receiving a request for a new file write from the NAS client 210, the NAS service processing unit 121 executes the process of FIG. 16.

[Step S11] The NAS service processing unit 121 adds, to the directory table 111, a record indicating directory information of the file requested to be written. At this time, an inode number is assigned to the file.

In addition, the NAS service processing unit 121 splits actual data of the file requested to be written into a plurality of chunks. For example, the NAS service processing unit 121 determines split points in the actual data of the file according to predetermined calculation rules in such a manner as to facilitate generation of chunks including the same data. Herewith, variable sized chunks are generated.

[Step S12] The NAS service processing unit 121 selects one chunk to be a process target, sequentially from the beginning of the file. The NAS service processing unit 121 calculates a hash HA based on a chunk data piece of the selected chunk (hereinafter simply referred to as "selected chunk data piece"). Then, the NAS service processing unit 121 requests the Bloom filter processing unit 122 for a lookup operation of the selected chunk data piece.

[Step S13] The Bloom filter processing unit 122 identifies a process-target level within the hierarchical Bloom filter 117 and one or more process-target Bloom filters amongst Bloom filters in the level. When step S13 is performed for the first time, the first level and the Bloom filter BF1 are identified as the process targets. The Bloom filter processing unit 122 identifies, within each of the process-target Bloom filters, three bits to be set to "1" through the following calculation. The Bloom filter processing unit 122 individually applies three hash functions to the hash HA calculated in step S12 to thereby obtain three hashes, each of which is then divided by the number of initial bits of each Bloom filter in the process-target level to obtain a remainder. Herewith, three remainders are calculated, and each of the remainders indicates bit positions to be set to "1". Note that the number of initial bits refers to the number of bits of a Bloom filter in initial state, which has undergone no reduction in the number of bits.

[Step S14] With respect to each of the process-target Bloom filters, the Bloom filter processing unit 122 determines if the Bloom filter has undergone a reduction in the number of bits (that is, if the number of bits stored in the storage space of the hierarchical Bloom filter 117 is less than the number of initial bits). If none of the process-target Bloom filters have undergone a reduction in the number of bits, the Bloom filter processing unit 122 moves to step S16. On the other hand, if at least one of the Bloom filters has undergone a bit number reduction, the Bloom filter processing unit 122 moves to step S15.

[Step S15] For the Bloom filter determined in step S14 to have undergone a bit number reduction, the Bloom filter processing unit 122 virtually adds a bit array of the number of bits deleted, to the high order end of the Bloom filter. The bits of the added bit array are all set to "1".

[Step S16] The Bloom filter processing unit 122 runs a membership test to determine whether the selected chunk data piece is present in a data group managed by any of the process-target Bloom filters. Specifically, the Bloom filter processing unit 122 determines, for each of the process-target Bloom filters, whether the bits identified in step S13 are all set to "1". If there is at least one Bloom filter with all the identified bits set to "1", it is interpreted as the presence of the chunk data piece.

When having determined the presence of the chunk data piece, the Bloom filter processing unit 122 moves to step S17. On the other hand, when having determined the absence of the chunk data piece, the Bloom filter processing unit 122 reports accordingly to the NAS service processing unit 121. In response to the report, the NAS service processing unit 121 performs step S21.

[Step S17] The Bloom filter processing unit 122 determines whether the current process-target Bloom filters are located in the bottom level (the third level). The Bloom filter processing unit 122 moves to step S18 if the process-target Bloom filters are not located in the bottom level, and moves to step S19 if they are located in the bottom level.

[Step S18] The Bloom filter processing unit 122 shifts the process-target level to one level below the current level, and then moves to step S13. In step S13, amongst Bloom filters in the lower level, Bloom filters located directly below each Bloom filter for which the presence of the chunk data piece was determined in step S16 are set as the process targets.

[Step S19] The Bloom filter processing unit 122 reports, to the binary tree lookup unit 123, each Bloom filter for which the presence of the chunk data piece was determined in step S16 and requests the binary tree lookup unit 123 for a binary tree lookup operation. The binary tree lookup unit 123 performs a binary tree lookup using a tree structure dataset associated with each of the reported Bloom filters. In this binary tree lookup, it is determined whether the hash HA calculated in step S12 matches a hash corresponding to each node in a tree structure built based on the tree structure dataset.

The binary tree lookup unit 123 moves to step S20 if the presence of the selected chunk data piece is determined as a result of the binary tree lookup using one of the tree structure datasets. On the other hand, if the absence of the selected chunk data piece is determined as a result of the binary tree lookup using all of the tree structure datasets, the binary tree lookup unit 123 reports accordingly to the NAS service processing unit 121. In response to the report, the NAS service processing unit 121 performs step S21.

[Step S20] The process having reached step S20 means that the same chunk data piece as the selected one is already registered in the chunk data table 115. In this case, the corresponding reference counter is incremented while the selected chunk data piece is deleted without being registered in the chunk data table 115. This prevents the same chunk data piece from being redundantly stored in the storing unit 110.

Specifically, the Bloom filter processing unit 122 reports, to the NAS service processing unit 121, a group number (gno) and an index number (gindex) for identifying the chunk data piece found in a data group by the binary tree lookup in step S19. The NAS service processing unit 121 refers, within the reference counter table 114, to the "refcnt" field of a record with the reported group number and index number registered therein, and increments the reference counter value registered in this field.

In addition, the NAS service processing unit 121 registers, in the chunk map table 112, a record corresponding to the chunk selected in step S12. The above-mentioned group number and index number are registered in this record, which thereby associates the chunk of the file with the chunk data piece in the chunk data table 115 of the storing unit 110.

[Step S21] The process having reached step S21 means that the same chunk data piece as the selected one is not stored in the chunk data table 115 of the storing unit 110. Therefore, the NAS service processing unit 121 performs a chunk data registration process for registering the selected chunk data piece in the storing unit 110. Details of this process are described in FIG. 17 below.

[Step S22] The NAS service processing unit 121 determines whether all the chunks generated by splitting the file have undergone steps S12 to S21. If any pending chunk remains, the NAS service processing unit 121 moves to step S12 and continues the process by selecting the next pending chunk in line as a process target. On the other hand, if all the chunks have already undergone the above steps, the NAS service processing unit 121 ends the file write process.

Figure 17:
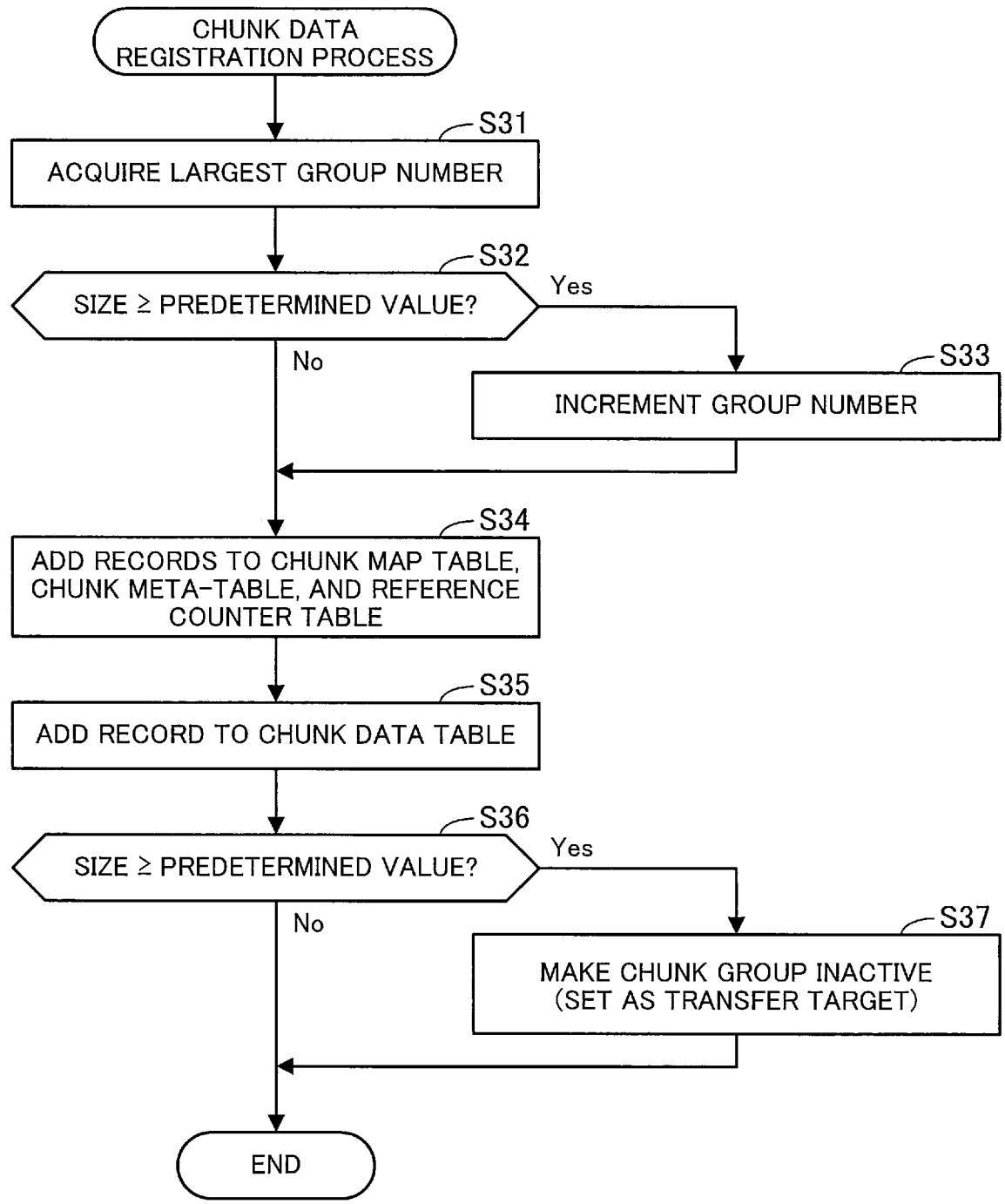
FIG. 17 is a flowchart illustrating an example of a chunk data registration process.

FIG. 17 is a flowchart illustrating an example of a chunk data registration process. The process of FIG. 17 corresponds to step S21 of FIG. 16.

[Step S31] The NAS service processing unit 121 refers to the chunk data table 115 and acquires the group number registered in the last record (i.e., the largest group number at this point of time).

[Step S32] The NAS service processing unit 121 determines whether the total size of chunk data pieces included in a chunk group corresponding to the group number acquired in step S31 is more than or equal to a predetermined value. The NAS service processing unit 121 moves to step S33 if the total size is more than or equal to the predetermined value, and moves to step S34 if the total size is below the predetermined value.

[Step S33] The NAS service processing unit 121 increments the group number acquired in step S31 to thereby generate a new group number.

[Step S34] The NAS service processing unit 121 adds a record to each of the chunk map table 112, the chunk meta-table 113, and the reference counter table 114.

When an affirmative determination (Yes) is obtained in step S32, the group number generated in step S33 is registered in the "gno" field of each of the records added, and an index number indicating the first chunk is registered in the "gindex" field. When a negative determination (No) is obtained in step S32, on the other hand, the group number acquired in step S31 is registered in the "gno" field of each of the records added. In addition, in the "gindex" field of each of the added records, an index number is registered, which indicates a chunk data piece following the last chunk data piece included in a chunk group corresponding to the group number.

As for the record added to the chunk map table 112, the inode number of the file requested to be written is registered in the "ino" field, and information on the process-target chunk is registered in the "offset" and "size" fields. As for the record added to the chunk meta-table 113, the hash HA calculated in step S12 of FIG. 16 is registered in the "hash" field. As for the record added to the reference counter table 114, the initial value of the reference counter, i.e., "1", is registered in the "refcnt" field.

[Step S35] The NAS service processing unit 121 adds a record to the chunk data table 115. At this time, within the record added, the same information stored in the "gno" and "gindex" fields in step S34 is registered in the fields of the same names, and the chunk data piece is compressed and then stored in the "data" field.

[Step S36] The NAS service processing unit 121 determines whether the total size of chunk data pieces included in a chunk group corresponding to the group number registered in the records in steps S34 and S35 is more than or equal to a predetermined value. The NAS service processing unit 121 moves to step S37 if the total size is more than or equal to the predetermined value, and ends the chunk data registration process if the total size is below the predetermined value.

[Step S37] The NAS service processing unit 121 makes inactive the chunk group corresponding to the group number stored in the records in steps S34 and S35, and sets the chunk group as a target to be transferred by the cloud transfer processing unit 125. For example, the group number indicating the chunk group is added to a transfer queue (not illustrated), to thereby set the chunk group as a transfer target.

Figure 18:
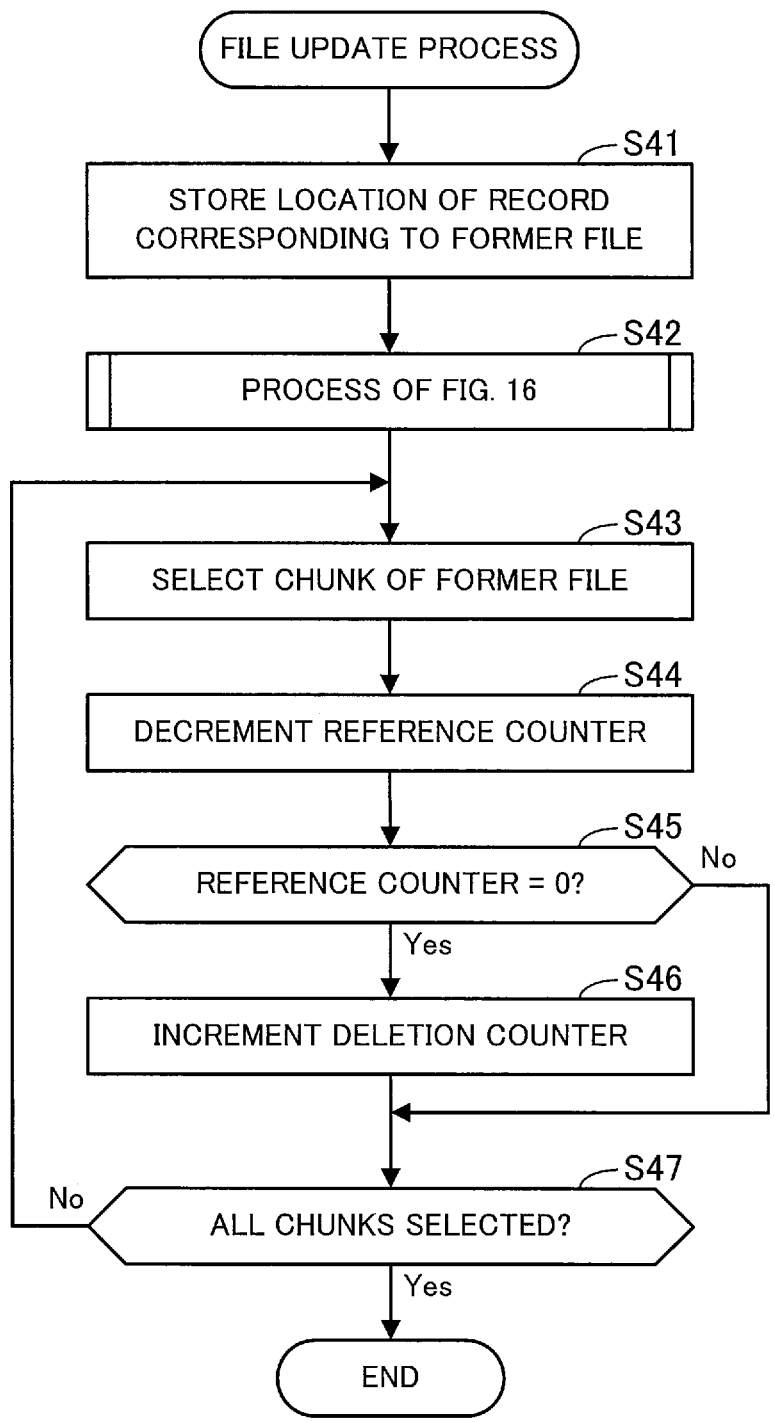
FIG. 18 is a flowchart illustrating an example of a file update process.

FIG. 18 is a flowchart illustrating an example of a file update process. Upon receiving a request to update an existing file from the NAS client 210, the NAS service processing unit 121 performs the process of FIG. 18.

[Step S41] The NAS service processing unit 121 stores, in the RAM 102, the location of a record corresponding to a pre-update file (former file), registered in the chunk meta-table 113.

[Step S42] The NAS service processing unit 121 performs the process of FIG. 16, using actual data of an updated file received from the NAS client 210 as a process target. Herewith, the actual data of the updated file is split into chunks, and the chunk meta-table 113, the reference counter table 114, and the chunk data table 115 are updated appropriately based on data of each of the chunks.

[Step S43] Based on the content of a record indicated by the location stored in step S41, the NAS service processing unit 121 selects one chunk to be a process target, sequentially from the beginning of the former file.

[Step S44] The NAS service processing unit 121 refers, within the reference counter table 114, to a record corresponding to a chunk data piece of the process-target chunk and decrements the reference counter value registered in the "refcnt" field. In addition, the NAS service processing unit 121 deletes, from the chunk map table 112, a record corresponding to the chunk selected in step S43.

[Step S45] The NAS service processing unit 121 moves to step S46 if the reference counter reads "0" after step S44, and moves to step S47 if the reference counter reads a value greater than "0".

[Step S46] The NAS service processing unit 121 refers to the deletion counter table 116 and increments a deletion counter corresponding to a data group to which the chunk data piece of the process-target chunk belongs.

[Step S47] The NAS service processing unit 121 determines whether all the chunks generated by splitting the former file have undergone steps S43 to S46. If any pending chunk remains, the NAS service processing unit 121 moves to step S43 and continues the process by selecting the next pending chunk in line as a process target. On the other hand, if all the chunks have already undergone the above steps, the NAS service processing unit 121 ends the file update process.

Figure 19:
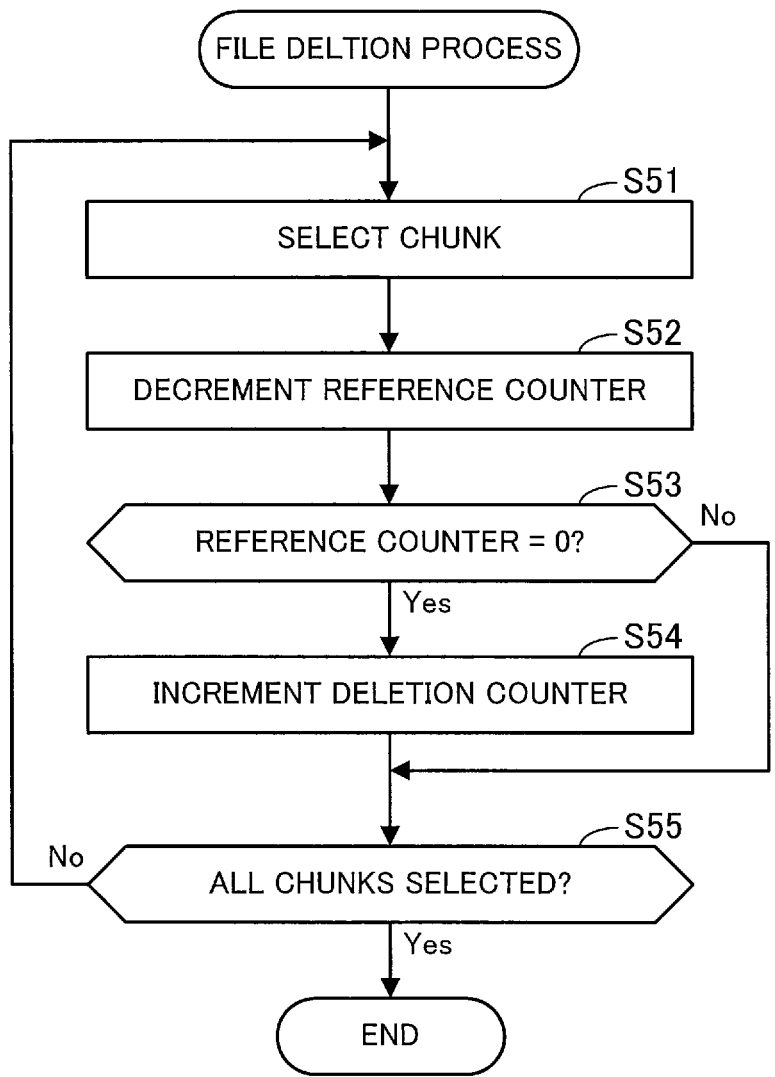
FIG. 19 is a flowchart illustrating an example of a file deletion process.

FIG. 19 is a flowchart illustrating an example of a file deletion process. Upon receiving a request to delete a file from the NAS client 210, the NAS service processing unit 121 performs the process of FIG. 19.

[Step S51] Based on the chunk map table 112, the NAS service processing unit 121 selects one chunk to be a process target, sequentially from the beginning of the file requested to be deleted.

[Step S52] The NAG service processing unit 121 refers, within the reference counter table 114, to a record corresponding to a chunk data piece of the process-target chunk and decrements the reference counter value registered in the "refcnt" field. In addition, the NAS service processing unit 121 deletes, from the chunk map table 112, a record corresponding to the chunk selected in step S51.

[Step S53] The NAS service processing unit 121 moves to step S54 if the reference counter reads "0" after step S52, and moves to step S55 if the reference counter reads a value greater than "0".

[Step S54] The NAS service processing unit 121 refers to the deletion counter table 116 and increments a deletion counter corresponding to a data group to which the chunk data piece of the process-target chunk belongs.

[Step S55] The NAS service processing unit 121 determines whether all chunks generated by splitting the file have undergone steps S51 to S54. If any pending chunk remains, the NAS service processing unit 121 moves to step S51 and continues the process by selecting the next pending chunk in line as a process target. On the other hand, if all the chunks have already undergone the above steps, the NAS service processing unit 121 deletes the record of the deletion-target file from the directory table 111 and ends the file deletion process.

Figure 20:
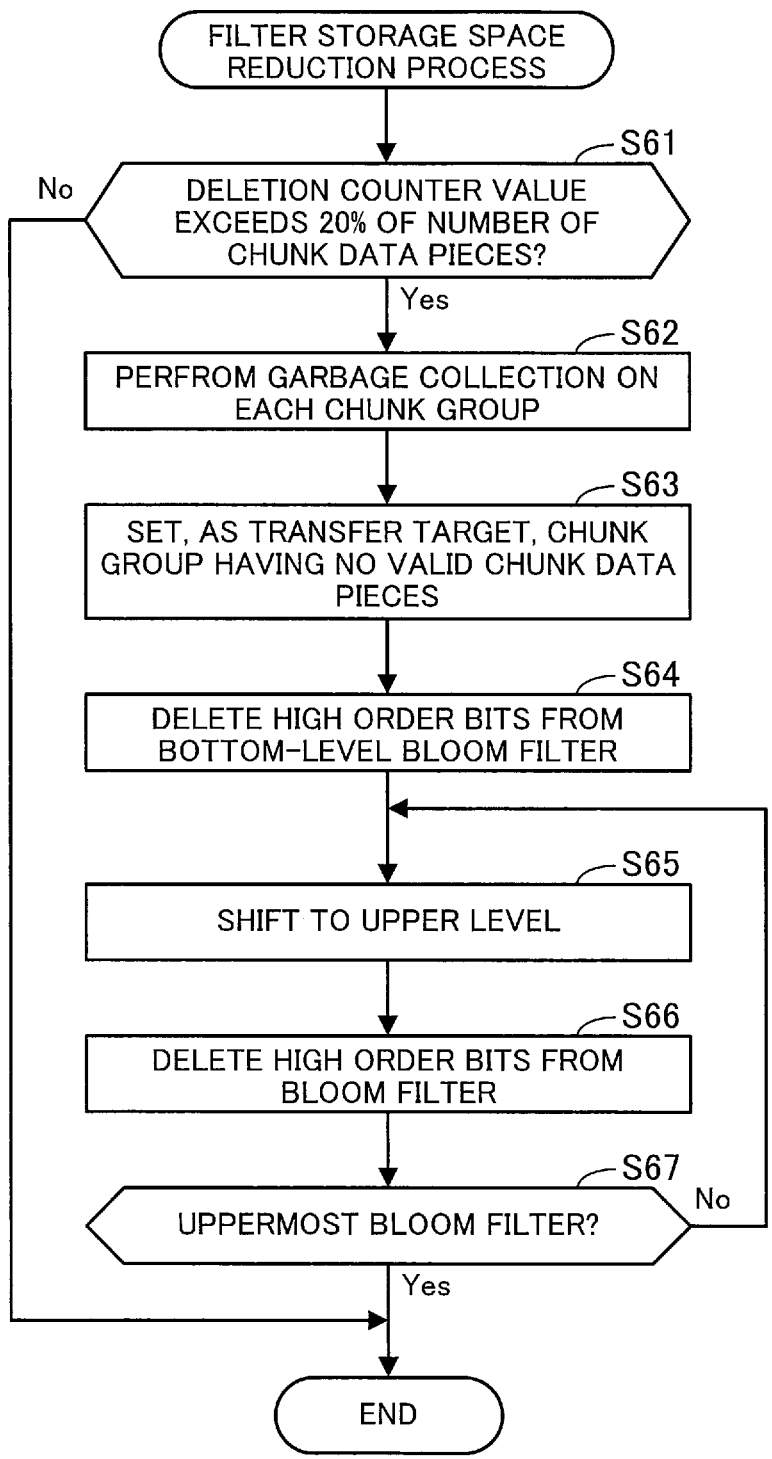
FIG. 20 is a flowchart illustrating an example of a filter storage space reduction process.

FIG. 20 is a flowchart illustrating an example of a filter storage space reduction process. The filter storage space reducing unit 124 sequentially refers to each record in the deletion counter table 116 and performs the process of FIG. 20 for each record. Note that the process of FIG. 20 is performed asynchronously with the individual processes of FIGS. 16 to 19.

[Step S61] The filter storage space reducing unit 124 acquires, from the referenced record, the deletion counter value in the "delcnt" field. In addition, the filter storage space reducing unit 124 identifies a data group to which chunk data pieces corresponding to the referenced record belong, and calculates, based on the chunk data table 115, the total number of chunk data pieces included in each chunk group belonging to the identified data group. The filter storage space reducing unit 124 determines whether the acquired deletion counter value exceeds a value amounting to 20% of the calculated total number of chunk data pieces. The filter storage space reducing unit 124 moves to step S62 if the deletion counter value exceeds the value amounting to 20% of the total number of chunk data pieces, and ends, if not, the filter storage space reduction process for the referenced record.

[Step S62] The filter storage space reducing unit 124 performs garbage collection on each chunk group belonging to the data group identified in step S61.

[Step S63] If there is a chunk group no longer including valid chunk data pieces due to the garbage collection in step S62, the filter storage space reducing unit 124 sets this chunk group as a target to be transferred by the cloud transfer processing unit 125. For example, the group number indicating the chunk group is added to a transfer queue (not illustrated), to thereby set the chunk group as a transfer target.

[Step S64] The filter storage space reducing unit 124 calculates a decrease rate R of the number of chunk data pieces due to the garbage collection in step S62. The decrease rate R indicates the ratio of the number of invalid chunk data pieces deleted by the garbage collection to the total number of chunk data pieces included in the data group identified in step S61.

In addition, the filter storage space reducing unit 124 identifies a Bloom filter to which the data group identified in step S61 has been assigned. Herewith, one Bloom filter is identified amongst the Bloom filters in the bottom level (i.e., the third level). The filter storage space reducing unit 124 deletes a bit array at the high order end of the identified Bloom filter, to thereby reduce the number of bits of the Bloom filter to (1−R) times.

[Step S65] The filter storage space reducing unit 124 shifts, within the hierarchical Bloom filter 117, its process target to a Bloom filter located in the immediate upper level of the current process-target Bloom filter.

[Step S66] The filter storage space reducing unit 124 deletes, at the high order end of the process-target Bloom filter, a bit array having the same number of bits as the bit array deleted in step S64.

[Step S67] The filter storage space reducing unit 124 moves to step S65 if the process-target Bloom filter is not the uppermost Bloom filter (i.e., the Bloom filter in the first level), and ends the filter storage space reduction process for the referenced record if it is the uppermost Bloom filter.

Figure 21:
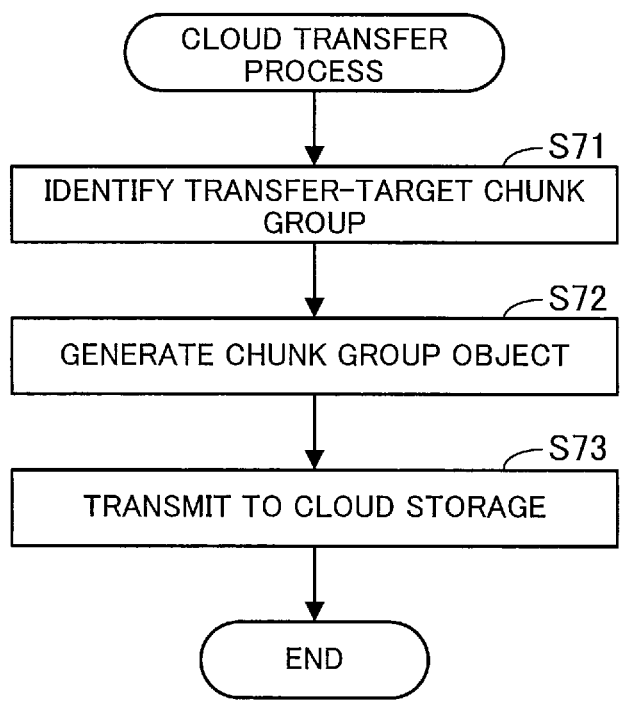
FIG. 21 is a flowchart illustrating an example of a cloud transfer process.

FIG. 21 is a flowchart illustrating an example of a cloud transfer process. Note that the process of FIG. 21 performed by the cloud transfer processing unit 125 is performed asynchronously with the individual processes of FIGS. 16 to 19 performed by the NAS service processing unit 121.

[Step S71] The cloud transfer processing unit 125 identifies a chunk group set as a transfer target amongst chunk groups registered in the chunk data table 115. For example, in the case where group numbers each indicating a transfer-target chunk group have been added to a transfer queue, the cloud transfer processing unit 125 extracts one group number from the transfer queue.

The chunk group identified in step S71 may be the chunk group set as a transfer target in step S37 of FIG. 17. There are two cases when such a chunk group is identified: a case where the process of FIG. 16 has been performed in response to a request to write a new file; and a case where the process of FIG. 18 has been performed in response to a request to update a file. For convenience, the former is referred to as the "first case" and the latter as the "second case". Further, the chunk group identified in step S71 may be the chunk group set as a transfer target in step S63 of FIG. 20. This case is referred to as the "third case".

[Step S72] The cloud transfer processing unit 125 generates the chunk group object 131. As for the chunk group object 131, for example, the group name of the chunk group identified in step S71 is set as the object name. In addition, in the first and second cases above, individual chunk data pieces included in the transfer-target chunk group are obtained from the chunk data table 115 and set as the object value of the chunk group object 131. In the first case, the generated chunk group object 131 is information to be used to request the cloud storage 240 to store chunk data pieces included in a new chunk group. In the second case, the generated chunk group object 131 is information to be used to request the cloud storage 240 to update chunk data pieces included in an existing chunk group. On the other hand, in the third case, the generated chunk group object 131 is information to be used to request the cloud storage 240 to delete chunk data pieces included in an existing chunk group.

[Step S73] The cloud transfer processing unit 125 transfers the generated chunk group object 131 to the cloud storage 240.

Note that the processing functions of each of the apparatuses described in the embodiments above (the data processor 1 and the cloud storage gateway 100) may be achieved by a computer. In this case, a program is made available in which processing details of the functions to be provided to each of the above-described apparatuses are described. By executing the program on the computer, the above-described processing functions are achieved on the computer. The program in which processing details are described may be recorded in a computer-readable storage medium. Such computer-readable storage media include a magnetic storage device, an optical disk, a magneto-optical storage medium, and a semiconductor memory. Examples of the magnetic storage device are a hard disk drive (HDD), a flexible disk (FD), and a magnetic tape. Examples of the optical disk are a compact disc (CD), a digital versatile disc (DVD), and a Blu-ray disc (BD). An example of the magneto-optical storage medium is a magneto-optical disk (MO).

In the case of distributing the program, for example, portable storage media, such as DVDs and CD-ROMs, in which the program is recorded are sold. In addition, the program may be stored in a storage device of a server computer and then transferred from the server computer to another computer via a network.

A computer for executing the program stores, in its own storage device, the program, which is originally recorded in a portable storage medium or transferred from the server computer. Subsequently, the computer reads the program from the storage device and performs processing according to the program. Note that the computer is able to read the program directly from the portable storage medium and perform processing according to the program. In addition, the computer is able to sequentially perform processing according to a received program each time such a program is transferred from the server computer connected via a network.

According to one aspect, it is possible to reduce storage space consumed by Bloom filters according to a decrease in the number of data elements.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data processing apparatus comprising:
    a memory configured to store a data set including a plurality of data elements and a first Bloom filter used in a membership test to determine whether a query-target data element is present in the data set and having specific bits set to a specific value, the specific bits being determined by predetermined calculation using the plurality of data elements, respectively; and
    a processor configured to execute a process including:
        deleting, when some data elements are deleted from the data set, a first bit array from an end of a bit array of the first Bloom filter, the first bit array having a number of bits corresponding to a number of the some data elements;
        adding, when a first data element is entered as the query-target data element, a second bit array temporarily at an end of a bit array of a second Bloom filter, which is obtained by the deleting of the first bit array from the first Bloom filter, the second bit array having a same number of bits as the first bit array, with all bits set to the specific value; and
        running the membership test, using the second Bloom filter with the second bit array added thereto, to determine whether the first data element is present in the data set from which the some data elements have been deleted.

2. The data processing apparatus according to claim 1, wherein: the number of bits of the first bit array corresponds to a proportion of the number of the some data elements to a number of the plurality of data elements included in the data set.

3. The data processing apparatus according to claim 1, wherein:

the memory stores a first level Bloom filter used in a membership test to determine whether the query-target data element is present in a first data set and a plurality of second level Bloom filters used in a membership test to determine whether the query-target data element is present in respective second data sets, which is formed by splitting the first data set, the first Bloom filter being one second level Bloom filter amongst the plurality of second level Bloom filters, the data set being one second data set corresponding to the one second level Bloom filter amongst the plurality of second data sets; and the process further includes:
  deleting, when the some data elements are deleted from the data set, a third bit array from an end of a bit array of the first level Bloom filter, the third bit array having the same number of bits as the first bit array;
  adding, when the first data element is entered as the query-target data element, a fourth bit array temporarily at an end of a bit array of a third Bloom filter, which is obtained by the deleting of the third bit array from the first level Bloom filter, the fourth bit array being same as the second bit array; and
  running the membership test, using the third Bloom filter with the fourth bit array added thereto, to determine whether the first data element is present in the first data set from which the some data elements have been deleted.

4. The data processing apparatus according to claim 1, wherein:
  the memory has write data storage space including storage space of the data set; and
  the process further includes:
    storing, in the write data storage space, a plurality of write data elements requested from an external apparatus to be written, after deduplicating the plurality of write data elements, and also recording, in the memory, information indicating a correspondence relationship between at least each of the plurality of data elements and the plurality of write data elements;
    recording, for each of the plurality of data elements, a first count value in the memory, the first count value indicating how many of the plurality of write data elements the plurality of data elements each corresponds to;
    decrementing, in response to a request from the external apparatus to update or delete one of the plurality of write data elements that corresponds to one of the plurality of data elements, the first count value corresponding to the one of the plurality of data elements;
    recording, in the memory, a second count value indicating a number of data elements each having the first count value set to zero, amongst the plurality of data elements; and
    deleting, when the second count value exceeds a predetermined threshold, the data elements each having the first count value set to zero as the some data elements.

5. The data processing apparatus according to claim 4, wherein: the membership test to determine whether the first data element is present is run, in response to a request to write the first data element as one of the plurality of write data elements, to determine whether a same data element as the first data element is present in the data set.

6. The data processing apparatus according to claim 4, wherein: each of the plurality of write data elements is partial data of a file requested from the external apparatus to be written.

7. A non-transitory computer-readable storage medium storing a computer program that causes a computer to execute a process comprising:
  deleting, when some data elements are deleted from a data set including a plurality of data elements, stored in memory, a first bit array from an end of a bit array of a first Bloom filter used in a membership test to determine whether a query-target data element is present in the data set and having specific bits set to a specific value, the first bit array having a number of bits corresponding to a number of the some data elements, the specific bits being determined by predetermined calculation using the plurality of data elements, respectively;
  adding, when a first data element is entered as the query-target data element, a second bit array temporarily at an end of a bit array of a second Bloom filter, which is obtained by the deleting of the first bit array from the first Bloom filter, the second bit array having a same number of bits as the first bit array, with all bits set to the specific value; and
  running the membership test, using the second Bloom filter with the second bit array added thereto, to determine whether the first data element is present in the data set from which the some data elements have been deleted.

8. The non-transitory computer-readable storage medium according to claim 7, wherein: the number of bits of the first bit array corresponds to a proportion of the number of the some data elements to a number of the plurality of data elements included in the data set.

9. The non-transitory computer-readable storage medium according to claim 7, wherein:
  the memory stores a first level Bloom filter used in a membership test to determine whether the query-target data element is present in a first data set and a plurality of second level Bloom filters used in a membership test to determine whether the query-target data element is present in respective second data sets, which is formed by splitting the first data set, the first Bloom filter being one second level Bloom filter amongst the plurality of second level Bloom filters, the data set being one second data set corresponding to the one second level Bloom filter amongst the plurality of second data sets; and
  the process further includes:
    deleting, when the some data elements are deleted from the data set, a third bit array from an end of a bit array of the first level Bloom filter, the third bit array having the same number of bits as the first bit array;
    adding, when the first data element is entered as the query-target data element, a fourth bit array temporarily at an end of a bit array of a third Bloom filter, which is obtained by the deleting of the third bit array from the first level Bloom filter, the fourth bit array being same as the second bit array; and
    running the membership test, using the third Bloom filter with the fourth bit array added thereto, to determine whether the first data element is present in the first data set from which the some data elements have been deleted.

10. The non-transitory computer-readable storage medium according to claim 7, wherein:

the memory has write data storage space including storage space of the data set; and the process further includes:

storing, in the write data storage space, a plurality of write data elements requested from an external apparatus to be written, after deduplicating the plurality of write data elements, and also recording, in the memory, information indicating a correspondence relationship between at least each of the plurality of data elements and the plurality of write data elements;

recording, for each of the plurality of data elements, a first count value in the memory, the first count value indicating how many of the plurality of write data elements the plurality of data elements each corresponds to;

decrementing, in response to a request from the external apparatus to update or delete one of the plurality of write data elements that corresponds to one of the plurality of data elements, the first count value corresponding to the one of the plurality of data elements;

recording, in the memory, a second count value indicating a number of data elements each having the first count value set to zero, amongst the plurality of data elements; and deleting, when the second count value exceeds a predetermined threshold, the data elements each having the first count value set to zero as the some data elements.

11. The non-transitory computer-readable storage medium according to claim 10, wherein: the membership test to determine whether the first data element is present is run, in response to a request to write the first data element as one of the plurality of write data elements, to determine whether a same data element as the first data element is present in the data set.

* * * * *